United States Patent
Chen

(10) Patent No.: US 9,547,911 B2
(45) Date of Patent: Jan. 17, 2017

(54) VELOCITY ESTIMATION FROM IMAGERY USING SYMMETRIC DISPLACED FRAME DIFFERENCE EQUATION

(71) Applicant: Wei Chen, Potomac, MD (US)

(72) Inventor: Wei Chen, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 37 days.

(21) Appl. No.: 14/027,906

(22) Filed: Sep. 16, 2013

(65) Prior Publication Data

US 2014/0016829 A1 Jan. 16, 2014

Related U.S. Application Data

(63) Continuation-in-part of application No. 13/323,975, filed on Dec. 13, 2011, now Pat. No. 8,781,165.

(60) Provisional application No. 61/701,019, filed on Sep. 14, 2012, provisional application No. 61/422,758, filed on Dec. 14, 2010.

(51) Int. Cl.
  *G06K 9/00* (2006.01)
  *G06T 7/20* (2006.01)
  *H04N 7/01* (2006.01)

(52) U.S. Cl.
  CPC ............... *G06T 7/20* (2013.01); *G06T 7/2026* (2013.01); *H04N 7/0137* (2013.01); *G06T 2207/10016* (2013.01); *G06T 2207/10048* (2013.01); *G06T 2207/30236* (2013.01); *H04N 7/014* (2013.01)

(58) Field of Classification Search
  None
  See application file for complete search history.

(56) References Cited

U.S. PATENT DOCUMENTS

| | | | |
|---|---|---|---|
| 6,480,615 B1 * | 11/2002 | Sun et al. | 382/103 |
| 6,535,647 B1 | 3/2003 | Abousleman | |
| 6,539,122 B1 | 3/2003 | Abousleman | |
| 6,771,825 B1 | 8/2004 | Hurst | |
| 6,804,400 B1 | 10/2004 | Sharp | |
| 7,453,941 B1 | 11/2008 | Yamori | |
| 8,432,974 B2 | 4/2013 | Chen | |
| 8,736,767 B2 | 5/2014 | van Beek | |

(Continued)

OTHER PUBLICATIONS

B. D. Lucas and T. Kanade, "An iterative image registration technique with an application to stereo vision", In DARPA Proc. of Image Understanding Workshop, pp. 121-130, Apr. 1981.

(Continued)

*Primary Examiner* — Randolph I Chu
(74) *Attorney, Agent, or Firm* — U.S. Naval Research Laboratory

(57) ABSTRACT

A method and apparatus for processing an image sequence described herein that provides a symmetric displaced frame difference equation. Next, an input image sequence can be received that includes a pair of image frames individually including multidimensional image data corresponding to a plurality of pixel locations at different times. Finally, using at least one processor, the symmetric displaced frame difference equation can be solved using an iteration equation and the image data of the pair of image frames to determine a displacement field describing displacement vectors at half of the total displacement vector.

17 Claims, 11 Drawing Sheets

(56) References Cited

U.S. PATENT DOCUMENTS

| | | |
|---|---|---|
| 2003/0021472 A1 | 1/2003 | Nichogi et al. |
| 2004/0086047 A1 | 5/2004 | Kondo |
| 2006/0222078 A1 | 10/2006 | Raveendran |
| 2006/0269140 A1 | 11/2006 | Ramsay et al. |
| 2007/0074266 A1 | 3/2007 | Raveendran |
| 2008/0151101 A1 | 6/2008 | Tian et al. |
| 2009/0028243 A1 | 1/2009 | Suzuki et al. |
| 2009/0161753 A1 | 6/2009 | Youn et al. |
| 2010/0002764 A1 | 1/2010 | Lie |
| 2010/0201870 A1 | 8/2010 | Luessi |
| 2011/0002532 A1 | 1/2011 | Frakes et al. |
| 2011/0007819 A1 | 1/2011 | Chen |
| 2011/0081050 A1 | 4/2011 | Chen |
| 2011/0255605 A1 | 10/2011 | Chang et al. |
| 2012/0147263 A1 | 6/2012 | Chen |
| 2012/0148110 A1 | 6/2012 | Chen |
| 2012/0148111 A1 | 6/2012 | Chen |
| 2012/0148112 A1 | 6/2012 | Chen |
| 2013/0188836 A1* | 7/2013 | Fang et al. .................... 382/103 |

OTHER PUBLICATIONS

Nagel, H. H., "Constraints for the estimation of displacement vector fields from image sequences". In Proc. Eighth International Joint Conference on Artificial Intelligence, Karlsruhe, West Germany, vol. 2, pp. 945-951, Aug. 1983.

Mercatini, A., A. Griffa, L. Piterbarg, Z. Zambianchi, M. G. Magaldi, "Estimating surface velocities from satellite data and numerical models: Implementation and testing of a new simple method", Ocean Modeling, 33, 190-203, Feb. 2010.

Garcia, C. A. and I. S. Robinson, "Sea surface velocities in shallow seas extracted from sequential coastal zone color scanner satellite data," J. Geophys. Res., vol. 94, No. C9, pp. 12 681-12 691, Sep. 1989.

M. Kamachi, "Advective surface velocities derived from sequential images for rotational flow field: Limitations and applications of maximum cross-correlation method with rotational registration," J. Geophys. Res., vol. 94, No. C12, pp. 18 227-18 233, Dec. 1989.

R. Tokmakian, P. T. Strub, and J. McClean-Padman, "Evaluation of the maximum cross correlation method of estimating sea surface velocities from sequential satellite images," J. Atmos. Ocean. Technol., vol. 7, No. 6, pp. 852-865, Jun. 1990.

W. J. Emery, C. Fowler, and A. Clayson, "Satellite-image-derived Gulf stream currents compared with numerical model results," J. Atmos. Ocean. Technol., vol. 9, No. 3, pp. 286-304, Jun. 1992.

J. A. Holland and X. H. Yan, "Ocean thermal feature recognition, discrimination, and tracking using infrared satellite imagery," IEEE Trans. Geosci. Remote Sens., vol. 30, No. 5, pp. 1046 1053, Sep. 1992.

Q. X. Wu, D. Pairman, S. J. McNeill, and E. J. Barnes, "Computing advective velocities from satellite images of sea surface temperature," IEEE Trans. Geosci. Remote Sens., vol. 30, No. 1, pp. 166-176, Jan. 1992.

Q. X. Wu and D. Pairman, "A relaxation labeling technique for computing sea surface velocities from sea surface temperature," IEEE Trans. Geosci. Remote Sens., vol. 33, No. 1, pp. 216-220, Jan. 1995.

Q. X. Wu, "A correlation-relaxation-labeling framework for computing optical flow-template matching from a new perspective," IEEE Trans. Pattern Anal. Mach. Intell., vol. 17, No. 9, pp. 843-853, Sep. 1995.

M. Moctezuma Flores, H. Maitre, and F. Parmiggiani, "Sea-ice velocity fields estimation on Ross Sea with NOAA-AVHRR," IEEE Trans. Geosci. Remote Sens., vol. 33, No. 5, pp. 1286-1292, Sep. 1995.

G. Borzelli, G. Manzella, S. Marullo, and R. Santoleri, "Observations of coastal filaments in the Adriatic Sea," J. Mar. Syst., vol. 20, No. 1-4, pp. 187-203, Apr. 1999.

C. M. Domíngues, G. A. Gonzalves, R. D. Ghisolfi, and C. A. E. García, "Advective surface velocities derived from sequential infrared images in the southwestern Atlantic ocean," Remote Sens. Environ., vol. 73, No. 2, pp. 218-226, Aug. 2000.

J. S. Prasad, A. S. Reajawat, Y. Pradhan, O. S. Chauhan, and S. R. Nayak, "Retrieval of sea surface velocities using sequential ocean color monitor data," Proc. Indian Acad. Sci. Earth Planet. Sci., vol. 111, No. 3, pp. 189-195, Sep. 2002.

M. M. Bowen, W. J. Emery, J. L. Wilkin, P. C. Tildesley, I. J. Barton, and R. Knewtson, "Extracting multiyear surface currents from sequential thermal imagery using the maximum cross-correlation technique," J. Atmos. Ocean. Technol., vol. 19, No. 10, pp. 1665-1676, Oct. 2002.

L. Alberotanza and A. Zandonella, "Surface current circulation estimation using NOAA/AVHRR images and comparison with HF radar current measurements," Int. J. Remote Sens., vol. 25, No. 7/8, pp. 1357-1362, Apr. 2004.

S. Dransfeld, G. Larnicol, and P. Y Le Traon, "The potential of the maximum cross-correlation technique to estimate surface currents from thermal AVHRR global area coverage data," IEEE Geosci. Remote Sens. Lett., vol. 3, No. 4, pp. 508-511, Oct. 2006.

R. I. Crocker, D. K. Matthews, W. J. Emery, and D. G. Baldwin, "Computing coastal ocean surface currents from infrared and ocean color satellite imagery," IEEE Trans. Geosci. Remote Sens., vol. 45, No. 2, pp. 435-447, Feb. 2007.

Matthews, D. K., and W. J. Emery, "Velocity observations of the California Current derived from satellite imagery," J. Geophys. Res., 114, C08001, Aug. 2009.

Marcello, J., F. Eugenio, F. Marqués, A. Hernández-Guerra, and A. Gasull, "Motion Estimation Techniques to Automatically Track Oceanographic Thermal Structures in Multisensor Image Sequences," IEEE Trans. Geosci. Rem. Sens., vol. 46, No. 9, Sep. 2008.

Lillestrand, R. "Techniques for change detection," IEEE Trans. Compt. 21, No. 7, 654-659, Jul. 1972.

A. Doshi, A. G. Bors, "Robust processing of optical flow of fluids," IEEE Trans. Image Processing, vol. 19, No. 9, pp. 2332-2344, Aug. 2010.

P. Heas and E. Memin, "Three-dimensional motion estimation of atmospheric layers from image sequences," IEEE Trans. on Geo science and Remote Sensing, vol. 46, No. 8, pp. 2385-2396, Aug. 2008.

Nagel, H. H., "Extending the 'oriented smoothness constraint' into the temporal domain and the estimation of derivatives of optical flow". In Computer Vision—ECCV '90, O. Faugeras (Ed.) vol. 427 of Lecture Notes in Computer Science, Springer, Berlin, pp. 139-148, Apr. 1990.

Chen, W.: Mied. R.P.: and Shen, C.Y, "Estimation of Surface Velocity from Infrared Image Using the Global Optimal Solution to an Inverse Model", Geoscience and Remote Sensing Symposium, 2008; IGARSS 2008; IEEE International; vol. I, pp. I-384-I-386, IEEE, 2008.

Chen, W.: Mied, R.P. and Shen, C.Y.: "Near-Surface Ocean Velocity from Infrared Images: Global Optimal Solution to an Inverse Model", Journal of Geophysical Research-Oceans. vol. 113. C10003, pp. 1-13, (Oct. 2008).

Emery, W.J.: Thomas, A.C.: Collins, M.J.: Crawford, W.R.: and Mackas, D.L,: "An Objective Method for Computing Advective Surface Velocities from Sequential Infrared Satellite Images", J. Geophys. Res. vol. 91, pp. 12865-12878. (1986).

Kelly, K.A., (1989), "An inverse Model for Near-Surface Velocity from Infrared Images", J. Phys. Ocean. vol. 19, pp. 1845-1864; (1989).

Kelly K.A.; and Strub, P.T., Comparison of Velocity Estimates from Advanced Very High Resolution Radiometer in the Coasial Transition Zone, J. Geophys. Res., vol. 97, pp. 9653-9668, (1992).

Ostrovskii, A., and Piterbarg, L., Inversion for Heat Anomaly Transport from Sea-Surface Temperature Time Series in the Northwest Pacific, J. Geophys. Res., vol. 100, pp. 4845-4865, (Mar. 1995).

Ostrovskii A.G., and Piterbarg L.I., "Inversion of Upper Ocean Time Series for Entrainment, Advection, and Diffusivity". J. Phys. Ocean, vol. 30. pp. 201-201. (2000).

Vigan. X.: Provost. C.: Bleck. r.; and Courtier. P.: "Sea Surface velocities from sea surface temperature image sequences 1. Method

(56) References Cited

OTHER PUBLICATIONS and validation using primitive equation model output". J. Geophys. Res., vol. 105. pp. 19499-19514, (2000).
Vigan. X. et al., "Sea Surface Velocities from Sea Surface Temperature Image Sequences 2. Application to the Brazil Malvinas Confluence Area". J. Geophys. Res., vol. 105, pp. 19515-19534, (2000).
Zavialov, P.O. et al., "An Inverse Model for Seasonal Circulation over the Southern Brazilian Shell: Near-Surface Velocity from the Heat Budget." J. Phys. Ocean. vol. 28, pp. 545-562, (1998).
Chubb. S.R.: Mied. R.P.: Shen, C.Y : Chen, W.: Evans T.E.: and Kohurt. J.: "Ocean Surface Currents from AVHRR Imagery: Comparison with Land-based HF Radar Measurements", IEEE Trans. on Geosciences and Remote Sensing, vol. 46, No. 11, pp. 3647-3660. (Nov. 2008).
Frankignoul. C. "Sea surface temperature anomalies, planetary waves, and air-sea feedback in the middle latitudes", J. Geophys. Res., vol. 23, pp. 357-390, (Nov. 1985).
Kundu, P.K "Ekman veering observed near the ocean bottom", J. Phys. Ocean, vol. 5, pp. 238-242, (1976).
Kohut. J.T.: Glenn, S.M.: and Chant, R.J.; "Seasonal Current Variability on the New Jersey Inner Shelf", J. Geophys. Res.-Oceans, vol. 109, pp. C07S07-1-C07S07-16, (2004).
Press, W.H.: Teukolsky, S.A.: Vetterling, W.T.; and Flannery, B.P.: "Numerical Recipes in C", Cambridge University Press. 2nd Edition. pp. 123-124, (1992).
Shen, C.Y.: and Evans, T.E.: "inertial instability and sea spirals", Geophys. Res. Lett., vol. 29, No. 23, pp. 39-1-39-4, do: 10.1029/2002Gl.015701, (2002).
Shen, C.Y.; Evans. T.E.: Mied, R.P.: and Chubb, S.R.: "A velocity projection framwork for inferring shallow water currents from surface tracer fields", "Cont. Shelf Research", vol. 28, pp. 849-864, 2008. (Available online Jan. 26, 2008).
Wentz, F.J.; Gentemann, C.; Smith, D.; and Chelton, D.; "Satellite measurements of sea surface temperature through clouds", Science, vol. 288, pp. 847-850, (May 2000).
Jing Zhang and Guizhong Liu, "An efficient reordering prediction-based lossless compression algorithm for hyperspectral images", Apr. 2007, IEEE Geoscience and Remote Sensing Letters, vol. 4, No. 2 pp. 283-287.
Jing Zhang and Guizhong Liu, "A novel lossless compression for hyperspectral images by adaptive classified arithmetic coding in wavelet domain", 2006, IEEE International Conference on Image Processing (ICIP), pp. 2269-2272.
Chen. W., "A Global Optimal Solution with Higher Order Continuity for the Estimation of Surface Velocity from Infrared Images", IEEE Trans. Geosci. Rem. Sens. vol. 48, No. 4, pp. 1931-1939, (Apr. 2010).
Chen, W.: "The global optimal surface velocity field near shoreline from infrared images", International Symposium on Photoelectronic Detection and Imaging 2009: Advances in Infrared Imaging and Applications, Proc. of SPIE vol. 7383, 73833-1-78333-10, conference dates Jun. 17-19, 2009, published Aug. 4, 2009.
Chen, W., "Surface Velocity Estimation From Satellite Imagery Using Displaced Frame Central Difference Equation", IEEE Trans. Geoscience and Remote Sensing, vol. 50, No. 7, pp. 2791-2801, date of publication Jan. 23, 2012.
Chen, W.: "Nonlinear Inverse Model for Velocity Estimation from an Image Sequence", J. Geophys. Res., vol. 116, pp. C06015-1-C06015-15, Jun. 22, 2011.
Chen, W., "A Nonlinear Model for Velocity Estimation from Infrared Image Sequences", International Archives of the Photogrammetry, Remote Sensing, and Spatial Information Science (ISPRS), Commission VIII, WG VIII/9, vol. XXXVIII, Part 8, Kyoto, Japan. pp. 958-963, conference date Aug. 9-12, 2010.
Chen, W., "Conservative Motion Estimation from Multi-Image Sequences". ISVC 2010, Proceedings Part I, Lecture Notes in Computer Science 6453, pp. 427-436, symposium date Nov. 29, 2010-Dec. 1, 2010.

Li, H.; Astrid, L.; Robert, F., "Image Sequence Coding at Very Low Bitrates: A Review"; IEEE Trans. Image Processing. vol. 3, No. 5, pp. 589-609. (Sep. 1994).
Stiller, C.; Konrad, J.; "Estimating motion in image sequences: A tutorial on modeling and computation of 2D motion", IEEE Signal Processing Magazine, pp. 70-91, (Jul. 1999).
Dubois, E., "Motion-compensated fittering of time-varying images".Multidimes. Syst. Signal Process, vol. 3, pp. 211-239, (1992).
Orchard M.T.; Sullivan, G.J.; "Overlapped block motion compensation: An estimation-theoretic approach." IEEE Trans. Image Process., vol. 3. No. 5. pp. 693-699. (Sep. 1994).
Castagno, R.: Haavisto. P.: Ramfoni. G.: "A method for motion adaptive Irame rate up-conversion", IEEE Trans. Circuits Syst. Video Technol., vol. 6, No. 5. pp. 436-446. (Oct. 1996).
Girod. B, "Efficiency analysis of multihypothesis motion-compensatedprediction for video coding," IEEE Trans. Image Process., vol. 9, No. 2, pp. 173-183, (Feb. 2000).
Lee, S.H.: Kwon, O.; Park, R.H.l "Weighted adaptive motion-compensated frame rate-up conversion," IEEE Trans. Consum. Electron., vol. 49, No. 3, pp. 485-492 (Aug. 2003).
Wedi. T., "Adaptive interpolation filters and high-resolution displacements for video coding", IEEE Trans. Circuits Syst. Video Technol., vol. 16, No. 4, pp. 484-491, (2006).
Gan, Z; Oi. L.; and Zhu, X.; "Motion compensated fram interpolation based on H.264 decoder," Electron. Lett., vol. 43, No. 1, pp. 96-98 (2007).
Choi. B.D.; Han, J.W.; Kim, C.S.; KO, S.J.; "Motion-compensated fram interpolation using bilateral motion estimation and adaptive overlapped block motion compensation", IEEE Trans. Circuits Syst. Video Technol., vol. 17, No. 4, pp. 407-416, (2007).
Huang. A.-M; Nguyen, T.; "A multistage motion vector processing method for motion-compensated frame interpolation," IEEE Trans. Circuit Syst. vol. 19, No. 5, pp. 694-708, (May 2008).
Zhang, Y.: Zhao, D.; Ji, X.; Wang, R.; Gao, W.; "A Spatio-Temporal Auto Regressive Model for Frame Rate Up conversion", IEEE Trans. Cicuit Syst., vol. 19, No. 9, pp. 1289-1301, (Sep. 2009).
Zhang, Y.; Zhao, D.; Ma, S.; Wang, R.; and Gao, W.; "A Motion-Aligned Auto-Regressive Model for Frame Rate Up Conversion", IEEE Transactions on Image Processing, vol. 19, No. 5, pp. 1240-1258, (May 2010).
Wang, C.; Zhang, L.; He, Y.; and Tan, Y. P.; "Frame Rate Up Conversion Using Trilateral Filtering", IEEE Trans. Circuit Syst. vol. 20, No. 6 pp. 886-893, (Jun. 2010).
Horn, B.: Shunk. B.: "Determining optical flow", Artificial Intelligence. No. 17. pp. 185-203, (Apr. 1980).
Lucas, B. D.; "Generalized image matching by the method of differences", PhD thesis, Carnegie Mellon Univ., (1984).
Eigun, J.; Granlung, G.H.: Wiklund. J.: "Multidimensional orientation estimation with applications to texture analysis and optical flow", IEEE TPAMI. (Aug. 1991).
Black. M.J.: Anandan, P.: "The robust estimation of multiple motions: parametric and piecewise smooth flow fields", Computer Vision and Image Understanding, vol. 63, No. 1, pp. 75-104, (1996).
Heitz, F. and Boutjemy, P., "Multimodal estimation of discontinuous optical flow using Markov random fields", IEEE Transactions on Pattern Analysis and Machine Intelligence, vol. 15, No. 12, pp. 1217-1232, (1993).
Nesi. P., "Variational approach to optical flow estimation managing discontinues", Image and Vision Computing. vol. 11, No. 7, pp. 419-439, (1993).
Weickert, J.: Schnorr, C.; "A theoretical framework for conves regularizers in PDE-based computation of imagemotion", International Journal of Computer Vision, vol. 45, No. 3, pp. 245-264, (2001).
Bruhn, A.; Weickert. J.: Schnorr, C., "Lucas/Karrade Meets Horn/Schunck: Combining Local and Global Optic Flow Methods", International Journal of Computer Vision, vol. 61, No. 3, pp. 211-231, (2005).
Papenberg, N.; Bruhn. A.; Brox, T.; Dias. S.; Weickert, J.; "Highly Accurate Optic Flow Computation with Theoretically Justified Warping", International Journal of Computer Vision, vol. 67, No. 2, pp. 141-158, (2006).

(56) References Cited

OTHER PUBLICATIONS

Glazer F., et al., "Scene matching by hierarchical correlation," Proc. IEEE Comp. Vision Pattern Recognition Cong., (Washinton, DC), DTIC, 10 pages, Jun. 1983.
Ghanbari, H.; Mills, M. : "Block matching motion estimations: New results," IEEE Trans. Circuit Syst., vol. 37, pp. 649-651, 1990.
Seferidis V.; Ghanbari, M.; "General approach to block-matching motion estimation," Journal of Optical Engineering, vol. 32, pp. 1464-1474, Jul. 1993.
Shi, J.; Tomasi, C.; "Good lecture to Irack", Proc. Computer Vision and Pattern Recognition, pp. 593-600, Jun. 1994.
Baker, S.; Scharstein. D.; Lewis, J.P.; Roth, S.; Black, M.J.; Szeliski, R.; "A Database and Evaluation Methodology for Optical Flow", Int J Comput Vis, vol. 92, pp. 1-31, conference date Oct. 2007.
Brox, T.; "Highly Accurate Optic Flow Computation with Theoretically Justified Warping", International Journal of Computer Vision, vol. 67, No. 2, pp. 141-158, (2006).
Robbins, J.D.: Netravalian, "Recursive motion compensation: A review", in "Image Sequence processing and Dynamic Scene Analysis". T.S. Huang, ed., pp. 76-103, Berlin, Germany, Springer-Verlag, (1983).
Liu, Y.: Huang, T.S.; "Vehicle-Type Motion Estimation from Multi-frame Images", IEEE Trans. Pattern Anl. Mach. Intell. vol. 15, No. 8, pp. 802-808, (Aug. 1993).
Bergen, J.P. : Burt. P. J.: Hingorani, R.: Peleg. S.; "A three-frame algorithm for estimating two-component image motion", IEEE Trans. Pattern Anal. Mach. Intell. vol. 14, No. 9, pp. 886-896, (Sep. 1992).
Shariat, H.; Price, K.; "Motion estimation with more than two frames", IEEE Trans. Pattern Anal. Mach. Intell. vol. 12, No. 5, pp. 417-434, May 1990).
Barron, J.L., Fleet, D.J., Beauchemin, S.S., "Performance of optical flow techniques", International Journal of Computer Vision, vol. 12, No. 1. pp. 43-77. (1994).
Leese, J.A.; Novak, C.S.: "An automated technique for obtaining cloud motion from geosynchronous satellite data using cross correlation." J. Appl. Meteor., vol. 10, No. 1, pp. 118-132, 1971.
Emery, W.J.; Thomas, A.C.; Collins, M.J. : Crawford, W.R.; Mackas, D.L.; "An Objective Method for Computing Advective Surface Velocities from Sequential Infrared Satellite Images," J. Geophys. Res., vol. 91, pp. 12865-12878, 1986.

Nagel, H. H.; Enkelmann, W.; "An investigation of smoothness constraints for the estimation of displacement vector fields from image sequences", IEEE Trans. Pattern Anal. Mach. Intell., vol. 8, pp. 565-593, (1986).
Uras, S.; Girosi, F.; Verri, A.; Torre V.; "A computational approach to motion perception", Biological Cybernetics, vol. 60, pp. 79-87, (1988).
Konrad, J.; Dubois, E., "Baysian Estimation of Motion Vector Fields", IEEE Trans. Pattern Analysis and Machine Intelligence, vol. 14, No. 9, pp. 910-927, Sep. 1992.
Alvarez, L., Esclarin, J., Lefebure, M Sanchez. J : "A PDE model for computing the optical flow, Proc. XVI Congreso de Ecuaciones Diferenciales y Aplicaciones", Las Palmas de Gran Canaria, Spain. pp. 1349-1356, Intelligence, vol. 13, No. 8, pp. 775-790, (1999).
Aubert, G.; Deriche, R.; Kornprobskt, P.; "Computing optical flow via variational techniques", SIAM Journal on Applied Mathematics, vol. 60, No. 1, pp. 156-182, (1999).
Kumar, A., Tannenbaum, A.R.: Balas; G.J.; "Optical flow; a curve exploration approach"; IEEE Transactions on Image Processing. vol. 5, No. 4, pp. 598-610, (1996).
Proesmans, M., et al., "Determination of optical flow and its discontinuities using non-linear diffusion", Computer Vision—ECCV '94, J. O. Eklundh (Ed.), vol. 801, Lecture Notes in Computer Science, Springer, Berling. pp. 295-304, (1994).
Galvin, B.; McCane, B.; Novins, K.: Mason, D.l Mills, S.; "Recovering motion fields: An analysis of eight optical flow algorithms", Proc. 1998 British Machine Vision Conference, Southampton, England, pp. 195-204, (1998).
McCane, B., Novins, K., Crannitch, D., Galvin, B., "On Benchmarking Optical Flow," Computer Vision and Image Understanding vol. 84, pp. 126-143 (2001).
R.D. Ghisolfi, "Estimativas da velocidade superficial no oceano Atlantico Sul Ocidental utlizando imagens sequencias do satellite AVHRR/NOAA," in Dissertacao de mestrado en Sensoramiento Remoto. Porto Alegre, Brazil:Univ. Federal do Rio Grande so Sul, Apr. 1995.
A. Moulin, J.R. Moisan, W.J. Emery, and J. Kohut, "A Comparison of Two Methods Measuring Surface Coastal Circulation: CODAR Versus Satellite Estimation Using the Maximum Cross-Correlation Technique," Melbourne, FL: Florida Inst. Tech., Mar. 2005.

\* cited by examiner

130 — EQUATION SYSTEM
EQ1 (FDFD$_{ij}$)
EQ2 (BDFD$_{ij}$)
EQ3 (FDVI$_{ij}$) $\begin{cases} \Delta x_{ij}(t_2) + \Delta x(i + \Delta x_{ij}(t_2), j + \Delta y_{ij}(t_2), t_1) = 0 \\ \Delta y_{ij}(t_2) + \Delta y(i + \Delta x_{ij}(t_2), j + \Delta y_{ij}(t_2), t_1) = 0 \end{cases}$
EQ4 (FDVI$_{ij}$)

FIG. 4

130 — EQUATION SYSTEM
EQ1 (FDFD$_{ij}$)
EQ2 (BDFD$_{ij}$)
EQ3 (BDVI$_{ij}$) $\begin{cases} \Delta x(x,y,t_1) + \Delta x(x + \Delta x(x,y,t_1), y + \Delta y(x,y,t_1), t_2) = 0 \\ \Delta y(x,y,t_1) + \Delta y(x + \Delta x(x,y,t_1), y + \Delta y(x,y,t_1), t_2) = 0 \end{cases}$
EQ4 (BDVI$_{ij}$)

FIG. 5

VELOCITY ESTIMATION FROM IMAGERY USING SYMMETRIC DISPLACED FRAME DIFFERENCE EQUATION

CROSS-REFERENCE TO RELATED APPLICATIONS

This application is a continuation-in-part of U.S. patent application Ser. No. 13/323,975, filed on Dec. 13, 2011, which claims priority to and the benefit of U.S. Provisional Patent Application Ser. No. 61/422,758, filed Dec. 14, 2010, the entirety of both applications which are hereby incorporated by reference. This application also claims priority to provisional patent application entitled, "Adaptive Quantum Communication," filed on Sep. 14, 2012, and assigned U.S. Application No. 61/701,024; the entire contents of which are hereby incorporated by reference.

FIELD OF THE INVENTION

The present disclosure relates generally to image processing and more particularly to apparatus and techniques for motion determination or estimation in processing image data.

BACKGROUND

Computer vision and remote sensing applications often utilize motion determination from an image sequence for video coding or other purposes. The determination of a displacement or motion field under brightness or tracer conservation constraints from an image sequence has thus far been considered an under-constrained problem. In general, the determination of the instant velocities from an image sequence or a physical displacement field from a featureless image sequence is ill-posed. Conventional motion estimation involves finding a velocity or displacement field using successive image frames, and existing motion estimation models and algorithms assume that the image intensity recorded from different physical sensors obey a conservation constraint for tracer, heat, or optical flow in space and time.

The inverse problem of the determination of the motion field under brightness (or tracer) conservation constraint from an image sequence has been considered as an under-constrained problem because two unknown velocity components must be derived from a single conservation equation at each of these pixel points, which is sometimes referred to as the aperture problem. The aperture problem indicates that the physical observation may not be consistent with the physical motion if there are not enough texture structures on moving objects. The physical determination of a displacement vector in a featureless image sequence is ill-posed, but this texture dependent problem is different from the under-constrained problem. In the past, the under-constrained problem has been addressed by using different models or frameworks with additional constraints and assumptions. For instance, Pel-Recursive techniques have been proposed, and differential techniques have been proposed using regularization, uniform velocity in a block (template), gradient conservation, and velocity field modeling with bilinear or B-spline type constraints. In addition, Bayesian methods have been proposed in which the motion field is modeled as a Markovian random field. However, these conventional techniques suffer from computational inefficiencies and inaccuracies which can lead to errors in video coding and other computer vision and remote sensing applications.

Accordingly, a need remains for improved methods and apparatus for processing image sequence data to determine displacement by motion compensation.

SUMMARY OF THE INVENTION

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

In an exemplary embodiment of the invention, a method for processing an image sequence described herein that provides a symmetric displaced frame difference equation. Next, an input image sequence can be received that includes a pair of image frames individually including multidimensional image data corresponding to a plurality of pixel locations at different times. Finally, using at least one processor, the symmetric displaced frame difference equation can be solved using an iteration equation and the image data of the pair of image frames to determine a displacement field describing displacement vectors at half of the total displacement vector. The multidimensional image data of the pair of frames can be two-dimensional, and the symmetric displaced frame difference equation can be:

$$DFCD_{ij} = I(i+u_{ij}\Delta t_h, j+v_{ij}\Delta t_h, t_2) + -I(i-u_{ij}\Delta t_h, j-v_{ij}\Delta t_h, t_1) = 0.$$

Solving the symmetric displaced frame difference equation can include using at least one iteration equation derived from the symmetric displaced frame difference equation by conversion to a fully or over-constrained system using a nonlinear least squares model of the displacement field. Additionally, solving the symmetric displaced frame difference equation can include using at least one bilinear polynomial function expressing a multidimensional displacement field.

In an alternative exemplary embodiment, a motion estimator apparatus can include at least one processor, and a memory storing a symmetric displaced frame difference equation. The at least one processor can be configured to receive an input image sequence comprising a pair of image frames individually including multidimensional image data corresponding to a plurality of pixel locations at different times, and the at least one processor can be further configured to solve the symmetric displaced frame difference equation using an iteration equation and the image data of the pair of image frames to determine a displacement field describing displacement vectors at half of the total displacement vector.

In an alternative exemplary embodiment, a computer readable medium with computer executable instructions can be configured to provide a symmetric displaced frame difference equation; receive an input image sequence comprising a pair of image frames individually including multidimensional image data corresponding to a plurality of pixel locations at different times; and solve the symmetric displaced frame difference equation using an iteration equation and the image data of the pair of image frames to determine a displacement field describing displacement vectors at half of the total displacement vector.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 4 is a schematic diagram illustrating an exemplary fully constrained set of nonlinear equations including forward and backward displaced frame difference equations and two forward displacement vector invariant equations in the motion estimator apparatus of FIG. 3;

FIG. 5 is a schematic diagram illustrating another exemplary fully constrained set of nonlinear equations including forward and backward displaced frame difference equations and two backward displacement vector invariant equations in the motion estimator apparatus of FIG. 3;

DETAILED DESCRIPTION OF EXEMPLARY EMBODIMENTS

Figure 1:
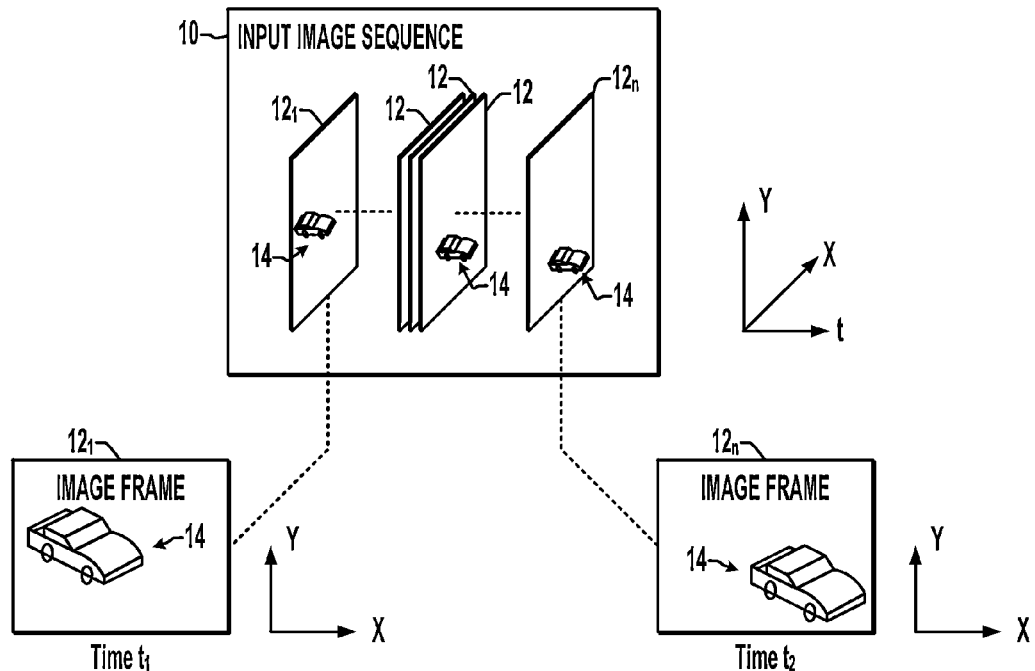
FIGS. 1 and 2 are schematic diagrams illustrating an input video image sequence which includes first and second image frames and corresponding pixel data obtained at different times.

One or more embodiments or implementations are hereinafter described in conjunction with the drawings, where like reference numerals refer to like elements throughout, and where the various features are not necessarily drawn to scale.

Figure 2:
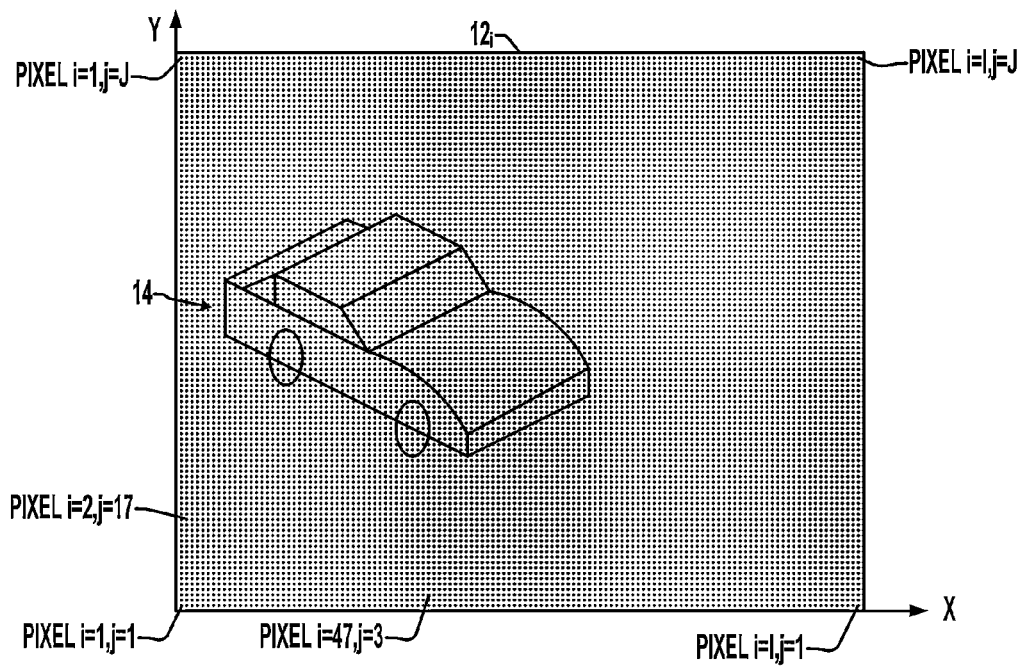

FIG. 1 illustrates an input image sequence 10 with a plurality of image frames 12 including a first image frame $12_1$, a final frame $12_n$, and one or more intervening frames 12 wherein the input sequence 10 can include any number "n" frames 12, where n is an integer greater than 1. As seen in FIG. 2, each individual image frame $12_i$ includes an integer number of pixel data values, each corresponding to a two-dimensional pixel location in an X-Y plane, where each pixel location is indicated with an integer subscript index "i" indicating an X direction pixel index ($1 \le i \le I$) and an integer subscript index "j" indicating a Y direction pixel index ($1 \le j \le J$). In the illustrated example, moreover, the image data represents optical (e.g., visible) data, such as video frames 12, where the input sequence 10 shows a vehicle artifact 14 moving towards a lower right corner of the image frame as the sequence proceeds from an initial (e.g., first) time $t_1$ (frame $12_1$) to a final (e.g., second) time $t_2$ (frame $12_n$). In practice, as is known, the individual image data for a given pixel location i,j can be a single value representing light intensity (luminance) and/or an individual data point may include luminance as well as color or chrominance data values (e.g., L*a*b*, RGB, CMYK data, etc.). In other embodiments, the image sequence 10 can include multidimensional image data representing "thermal" images, for instance, where the data values represent temperature, or other image sequences can be used in which the image intensity is recorded from physical sensors, for tracer, heat, or optical flow in space and time.

Figure 3:
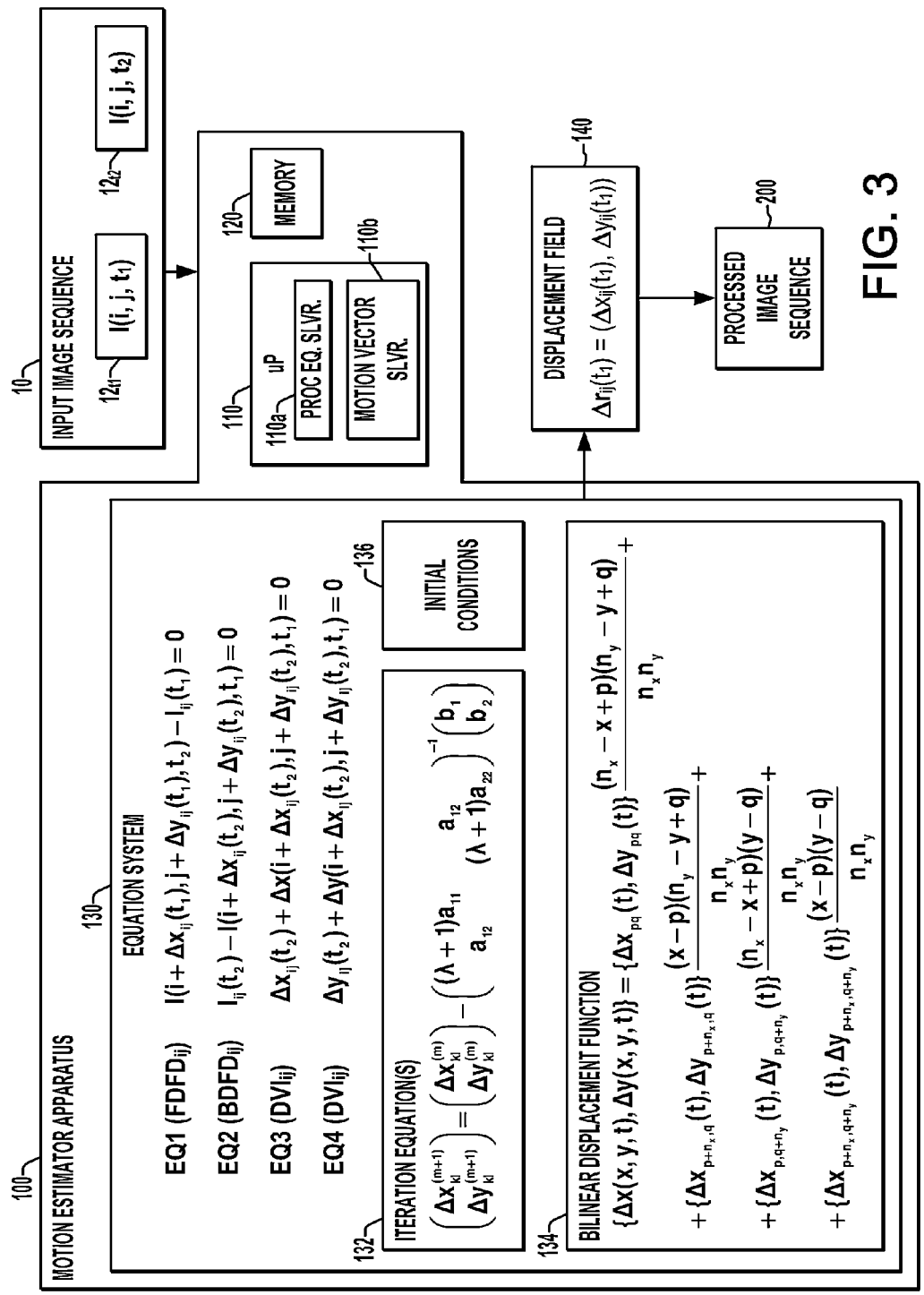
FIG. 3 is a schematic diagram illustrating an exemplary processor-implemented motion estimator apparatus using a fully constrained set of nonlinear equations to determine a displacement vector field from the input image sequence of FIGS. 1 and 2.

FIG. 3 illustrates an exemplary motion estimator apparatus 100 that can perform various image processing tasks including determining or estimating a motion or displacement field 140 from an input image sequence 10 having a first image frame $12_{t1}$ including multidimensional image data corresponding to a plurality of pixel locations i, j at a first time $t_1$, and a second image frame $12_{t2}$ including multidimensional image data corresponding to a plurality of pixel locations at a second time $t_2$. The apparatus 100 can be used to determine a displacement field 140 according to the disclosed techniques for any two image frames 12, which may but need not be the initial and final frames 12 of an input image sequence 10. The apparatus 100 includes one or more processors 110 operatively coupled with a memory 120, and the apparatus 100 can be implemented in a single processing device or in distributed fashion across two or more processing elements 110. In the illustrated embodiment of FIG. 3, the processor 110 implements a PROC equation solver 110a used for solving iteration equations 132 with a Progressive Relaxation of the Over-Constraint (PROC) algorithm, as well as a Motion Vector Solver 110b is designed for solving the motion vectors at time $t=t_2$ with a bilinear motion vector function 134 during an iteration. In addition, the motion estimator apparatus 100 may form part of a larger system, such as a video processor coupled to a transmitter, a video camera, a frame rate up-converter, etc.

The estimator apparatus 100 receives the input image sequence 10 and generates a displacement vector field 140 which can be stored in the internal memory 120 and/or maybe outputted by the apparatus 100 alone or as part of a processed image sequence 200. In addition, the estimator provides an equation system 130, which may be stored in the electronic memory 120. The illustrated estimator 100 further includes at least one iteration equation 132 and the bilinear displacement (or motion) vector function 134, which can be stored in the memory 120 or otherwise be accessible for use by the processor 110 in performing the displacement field estimation function set forth herein. In particular, the iteration equations 132 in certain embodiments are derived from the equation set 130 by conversion to a fully or over-constrained system using a nonlinear least squares model of the displacement field, as discussed further below. In addition, the bilinear motion vector function 134 in certain embodiments expresses a multidimensional displacement field. The bilinear displacement vector function 134 in certain embodiments can be represented by compact form shown in equation (10) below.

The equation system 130 is a fully constrained nonlinear equation set of equations, where four exemplary equations are illustrated in the example of FIG. 3. In this regard, the derived or estimated displacement field 140 describes displacement vectors $\Delta r_{ij}(t_1)$ or $\Delta r_{ij}(t_2)$ at pixel locations i,j at one of the first and second times $t_1$ or $t_2$, for example a first displacement vector $r_{ij}(t_1)=(x_{ij}(t_1), y_{ij}(t_1))$ at $t_1$, or a second displacement vector $r_{ij}(t_2)=(x_{ij}(t_2), y_{ij}(t_2))$ at $t_2$. In the illustrated two dimensional case, the equation set 130 includes a forward displaced frame difference equation ($FDFD_{ij}$), a backward displaced frame difference equation ($BDFD_{ij}$), and two displacement vector invariant equations ($DVI_{ij}$), which are shown as equations (7) and (8) below. In one embodiment shown in FIG. 4, the third and fourth equations of the set 130 are forward displacement vector invariant equations (FDVI), and in another embodiment shown in FIG. 5, the third and fourth equations are backward DVI equations (BDVI). Using the image data from the two received input frames $12_{t1}$ and $12_{t2}$ corresponding to times $t_1$ and $t_2$, the processor 110 is programmed to solve the equation set 130 to determine a displacement field (140) describing displacement vectors $\Delta r_{ij}(t_1)$ or $\Delta r_{ij}(t_2)$ at pixel locations i, j at $t_1$ or $t_2$ using initial conditions 136 including presetting displacement field values at the other time. In this regard, the set of four equations 130 has a total of four unknown variables for each pixel location i, j, namely $x_{ij}(t_1)$, $y_{ij}(t_1)$, $x_{ij}(t_2)$, and $y_{ij}(t_2)$, and therefore the equation set 130 is fully constrained without approximation and without imposition of any additional constraints or assumptions.

In certain embodiments, the PROC equation Solver 110a is programmed to solve the equation set 130 using an iterative numerical and PROC techniques to determine the displacement field 140, and may employ any suitable initial conditions and loop termination logic, including without limitation a maximum number of iterations per pixel location i, j, alone or in combination with termination based on computed value changes being less than a predetermined threshold value. In certain embodiments, the Motion Vector Solver 110b solves the equations (3) and (4) below using a damped Newton-Raphson method with suitable initial values used in the computation. In other embodiments, the Motion Vector Solver 110b solves the equations (3) and (4) using bilinear modeling of the displacement field 140. The estimator 100 may provide the derived displacement field 140 for use in a variety of applications, such as video processing using an interpolator to construct one or more additional frames for frame rate up-conversion. In another example, the estimator 100 may provide the displacement field 140 for use with compression processing in a video encoder for selectively dropping certain frames 12 received with the input image sequence 10.

Figure 6A:
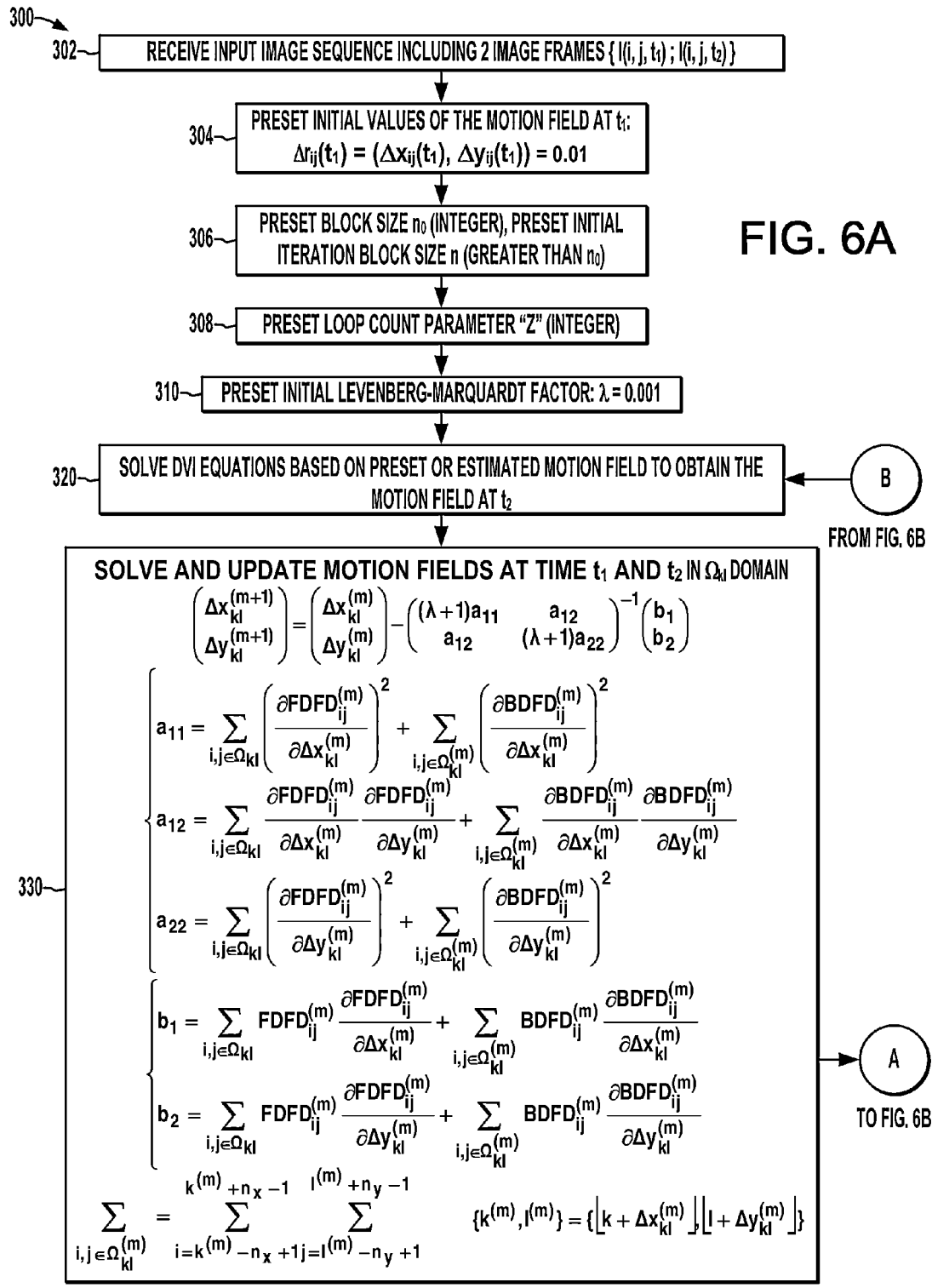
FIGS. 6A and 6B are flow diagrams illustrating an exemplary method for processing an image sequence having two image frames to estimate a motion vector field in accordance with the present disclosure.
Figure 6B:
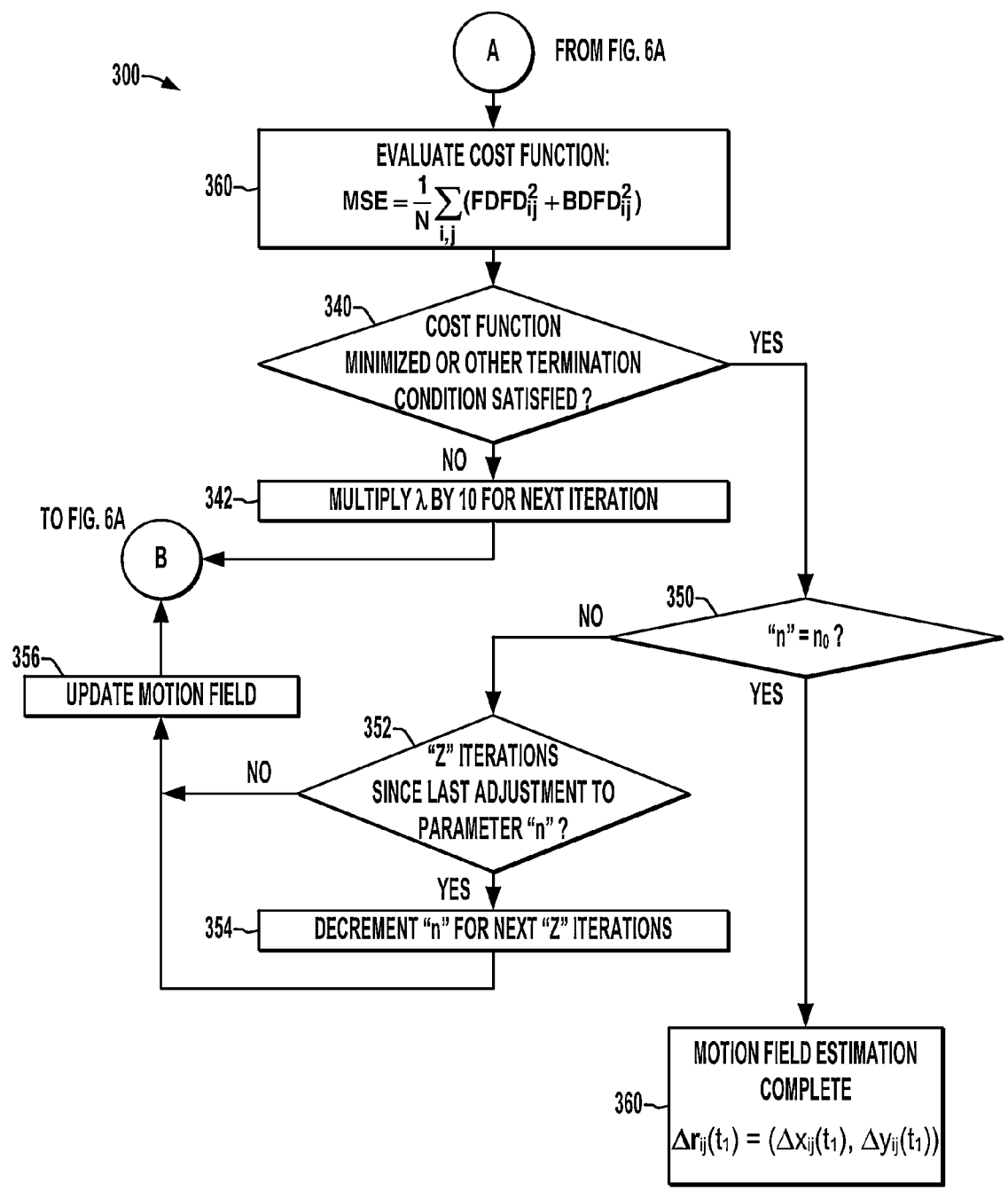

FIGS. 6A and 6B illustrate an exemplary method 300 for processing image data from an input image sequence 10 in accordance with further aspects of the present disclosure. While the method 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such illustrated acts may be combined or omitted. The illustrated method 300 may be implemented in hardware, processor-executed software, or combinations thereof, such as in the exemplary motion estimator apparatus 100 described above, and may be embodied in the form of computer executable instructions stored in a computer readable medium, such as in a memory 120 operatively associated with the processor 110 in one example.

At 302 in FIG. 6A, an input image sequence 10 is received including two frames, where the frame $12_{t1}$ includes a plurality of data values at time $t_1$ I(i, j, $t_1$), and the second frame $12_{t2}$ includes data values I(i, j, $t_2$) at time $t_2$ (e.g., image intensity data "I", which itself can be multidimensional (e.g., CMYK, etc.), and can represent optical, thermal, or other image data types, where the input frames 12 can be stored in the estimator memory 120 in certain embodiments. The method 300 also includes presetting initial values of the motion field at an initial reference time (e.g., $t_1$) at 304. In one possible implementation illustrated in FIG. 6A, seed values for the velocity vector components $u_{ij}(t_1)$ and $v_{ij}(t_1)$ are initialized at 304 to be 0.01 for each pixel location i, j, although this is one non-limiting example. A block size integer value ($n_0$) is preset at 306, which represents an integer number of pixels within an analysis block or tile of the images 12, and in certain embodiments sets the values for $n_x$ and $n_y$ to indicate the number of interpolation points on the orthogonal "x" and "y" directions of the image frames 12. In the example of FIG. 6A, any integer value can be used for presetting the block size $n_0$, such as 5 in one implementation. At 306, moreover, an initial iteration block size n is preset to an integer value that is greater than $n_0$ (e.g., n is initially set to be $n_0+10$ in one example). As discussed below, certain embodiments of the displacement field estimator apparatus 100 implements a progressive relaxation algorithm in which the block size "n" is selectively reduced during iteration to progressively relax an amount of over-constraint of the equation set 130. At 308, a loop count parameter "Z" is preset to an integer value, such as 10 in one example. In addition, an initial Levenburg-Marquardt factor $\lambda$ is preset at 310 for the iteration processing. In one example, this factor $\lambda$ is preset to 0.001, although other values can be used.

At 320 in FIG. 6A, a fully constrained nonlinear equation set is provided (e.g., equation set 130 in FIGS. 3-5 above) that includes a forward displaced frame difference equation (e.g., $FDFD_{ij}$), a backward displaced frame difference equation (e.g., $BDFD_{ij}$), and two or more displacement vector invariant equations (e.g., $DVI_{ij}$), which can be forward DVI equations (FIG. 4) or backward DVI equations (FIG. 5). The equation set is then solved for the displacement field (e.g., displacement field 140) at one of the first and second times ($t_1$, $t_2$) using known or estimated displacement field values at the other of the first and second times ($t_1$, $t_2$). Any suitable numerical technique can be employed at 330 to solve the equation set 130, such as Damped Newton-Raphson or other iterative technique, using bilinear modeling of the displacement field 134, etc., wherein any suitable initial values and termination conditions may be employed.

In the illustrated embodiment, the displacement vectors on node points are solved at 130 (FIG. 6A) by the iteration equations 132 and the displacement field estimate $\Delta r_{ij}(t_1)$ is updated and $\Delta r_{ij}(t_2)$ is solved in the local domain $\Omega_{k1}$ (FIGS. 8 and 9 below), after which the process 300 proceeds to 360 in FIG. 6B where a cost function is evaluated. A determination is made at 340 (FIG. 6B) as to whether the cost function is minimized or another termination condition is satisfied. If so (YES at 340), a determination is made at 350 as to whether the block size "n" is equal to the final block size value $n_0$ preset at 304 in FIG. 6A. If so (YES at 350), the motion field estimation is complete at 360.

If the cost function is not minimized and no other termination conditions are satisfied (NO at 340 in FIG. 6B), the Levenburg-Marquardt factor $\lambda$ is multiplied by 10 for the next iteration at 342, and the process 300 returns to again solve the displacement vectors at 320 and the iteration equations at 330 in FIG. 6A. This iterative algorithm continues as described above until the cost function is minimized or another termination condition is satisfied (YES at 340) and the block size "n" has not yet reached the preset value of $n_0$ (NO at 350). In this case, a determination is made at 352 as to whether the preset value "Z" iterations have occurred since the last adjustment to the block size parameter "n". If so (YES at 352), the block size "n" is decremented at 354, and the displacement field estimate $\Delta r_{ij}(t_1)$ is updated at 356, after which the process 300 returns to again solve the iteration equations at 330 in FIG. 6A. Otherwise (NO at 352 and FIG. 6B), the current block size value "n" is maintained, the displacement field estimate $\Delta r_{ij}(t_1)$ is updated at 356, and the process 300 returns to 330 in FIG. 6A for further iterations. In this manner, the process 300 provides an iterative approach for estimating the $\Delta r_{ij}(t_1)=\{\Delta x_{ij}(t_1), \Delta y_{ij}(t_1)\}$ at the reference time $t_1$ using the bidirectional DFD and DVI equations and the iteration equations 132 in the system 130.

As noted above, the motion estimator apparatus 100 employs a fully constrained nonlinear system of equations 130 which includes forward and backward displaced frame difference equations (EQ1 and EQ2 in FIG. 3 above) as well as two or more displacement vector invariant equations (EQ3 and EQ4 in FIG. 3). In addition, the displacement vector invariant equations may be either forward DVI equations or backward DVI equations in certain embodiments.

As further discussed below, the inventor has appreciated that such an equation set 130 facilitates motion determination from an image sequence in a variety of computer vision and remote sensing applications such as velocity or displacement estimation from motion, object tracking or recognition, medical imaging, advanced video editing, and ocean surface current estimation. The use of this fully constrained equation set 130 without having to make further approximations or to impose any additional constraints or assumptions provides a novel solution to the inverse problem of motion estimation in two successive image frames 12. In this regard, determination of the instant velocity is ill-posed because the information about the path and rate is lost after a temporal sampling. If the images have enough texture morphologies, both initial and final configurations of a moving particle are recorded by the image sequence. The inverse problem for determination of the displacement field 140, however, is well-posed because both initial and final positions can be determined and observed physically based on the input image sequence 10.

The inventor has appreciated that if the initial and final positions of a particular artifact (e.g., artifact 14 in FIG. 2 above) can be physically observed and determined from an image sequence, a fully constrained system of equations 130 can be constructed for resolving the inverse problem. If the initial and final positions cannot be physically determined or observed, the fully constrained equation system 130 can still be used to solve the inverse problem, although there may exist multiple solutions of the fully constrained (nonlinear) system 130 that are consistent with the physical observation. In addition, all motion fields are defined by the displacement field 130 or the average (conservative) velocity fields denoted by $v=\bar{v}=\Delta r/\Delta t$, where $\Delta r$ is the displacement vector and $\Delta t = t_2-t_1$ is the time difference between image frames at time $t_1$ and $t_2$.

As used herein, "conservative velocity" is not intended to mean that the physical velocity is a conservative quantity. This concept of equivalent motion fields between the displacement and the conservative velocity is based on the definition. If the initial and final positions of a moving particle or artifact in two successive frames are the only input information, the unique total displacement vector may be associated with many different intermediate dynamic motion states. However, only the motion with the conservative velocity is collinear with the displacement trajectory (a straight line). Focusing strictly on the initial and final results, the conservative velocity as used herein is the resolved velocity field, i.e., the solved velocity is only an average (conservative) velocity. To avoid any misunderstanding on this concept, all derivations in this disclosure are based on the displacement vector field 140 that describes displacement vectors ($\Delta r_{ij}(t_1)$, $\Delta r_{ij}(t_2)$) with respect to pixel locations (i, j) at the first and second times ($t_1$, $t_2$). In this respect, it is understood that there is only limited information available from an input image sequence 10 to study the inverse problem without any way of absolutely knowing the real physical (dynamic) processes or the identity of physical objects, which can be rigid bodies, liquid flow, or deformed objects in an image scene 12, but the above described processed 300 can be advantageously employed to determine motion fields that are consistent with the physical observation.

To illustrate, a function I(r, t) is defined as a scalar property (e.g., intensity) of a continuum of particles that may be expressed as a point function of the coordinates (r=r(t)), where "r" is a multidimensional position (e.g., x and y positions in a two dimensional example). In other examples, depending on the application, I(r, t) can be defined as the intensity of the optical flow (in computer vision), the tracer concentration (ocean color), or the temperature of heat flow (in geosciences and remote sensing). If the intensity between two images is conserved, then the following equation (1) represents the conservation constraint, regardless of a source term:

$$\frac{dI}{dt} = \left(\frac{\partial}{\partial t} + v \cdot \nabla\right)I = 0, \quad (1)$$

where the operator $$\frac{d}{dt}$$

denotes a total derivative with respect to time t, and $$v = \frac{dr}{dt} = v(r(t), t)$$

is the velocity vector in Cartesian coordinates. Equation (1) is sometimes referred to as the optical flow or brightness conservation constraint equation (in computer vision), or the heat flow or tracer conservation equation (in geophysics), and is a differential form of conservation constraint. The differential form of the conservation constrained equation (1) which contains linear terms of the components of the velocity holds only for infinitesimal or close infinitesimal motions.

In order to constrain the image scenes at time $t=t_1$ and $t=t_2$, equation (1) is an integrated from time $t_1$ to $t_2$ as follows:

$$\int_{t_1}^{t_2} \frac{dI(r(t), t)}{dt} dt = I(t(t_2), t_2) - I(r(t_1), t_1) \equiv 0, \quad (2)$$

where $r(t_1)$ and $r(t_2)$ are the position vectors at time $t_1$ and $t_2$. If a displacement vector field is defined by $\Delta r = r(t_2) - r(t_1)$, then the displaced frame difference (DFD) equation is given by $DFD = I(r(t_1) + \Delta r, t_2) - I(r(t_1), t_1) \equiv 0$. The conservation constraint equation (1) is thus temporally integrated into the path independent equation (2). It is noted that although the DFD equation is an implicit function on the displacement field 140, the two path independent terms in equation (2) correspond to the initial and final states of motion associated with the two successive frames for this conservation system. Employing the DFD equation derived by integrating between time of two successive frames can achieve higher accuracy in comparison with the differential form of the conservation constraint optical flow equation (1) (a first order term of Taylor expansion of the DFD), especially for large scale displacement motion estimation. As the image intensity change at a point due to motion has only one constraint equation (1), while the motion vector at the same point has two components (a projection case), the motion field was previously believed to be not computable without an additional constraint.

Figure 7A:
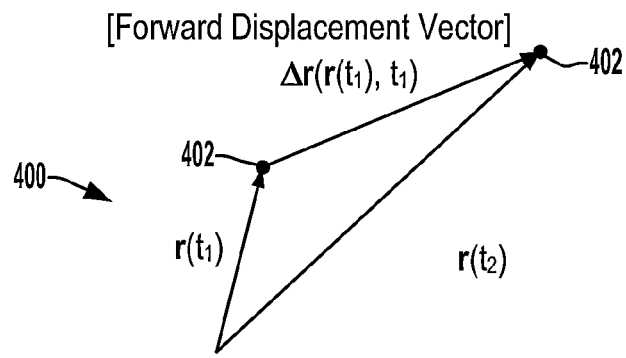
FIG. 7A is a vector diagram illustrating an exemplary forward displacement vector.
Figure 7B:
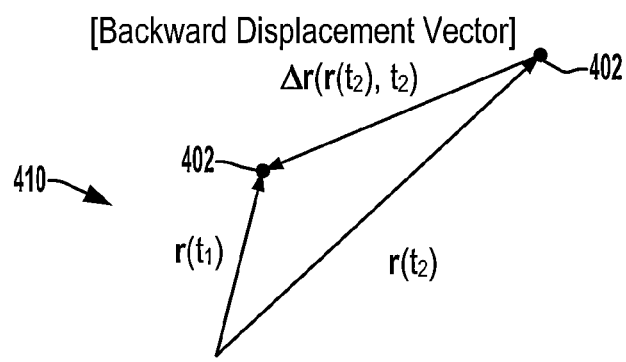
FIG. 7B is a vector diagram illustrating a corresponding backward displacement vector.
Figure 7C:
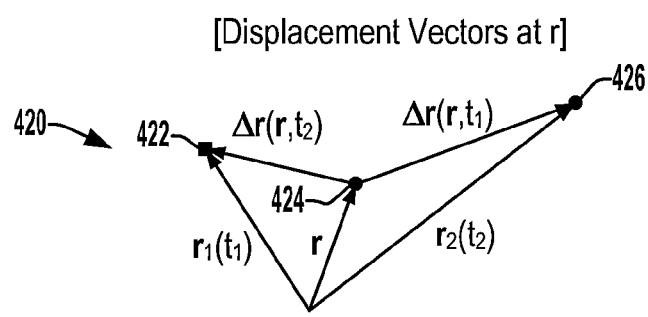
FIG. 7C is a vector diagram illustrating exemplary displacement vectors corresponding to a pair of moving particles in an image sequence.

Referring also to FIGS. 7A-7C, the displacement vector $\Delta r(r(t_1), t_1)$ (forward displacement vector) connects the initial and final positions of the particle 402 as shown in the plot 400 of FIG. 7A and the velocity field is the time rate of change of the property with respect to specific particles of the moving continuum. The same displacement vector on an image scene at time $t_1$ and $t_2$ may have two different forms. We define these displacement vectors $\Delta r(r(t_1), t_1)$ and $\Delta r(r(t_2), t_2)$ as shown in the graph 404 10 of FIGS. 7A and 7B as forward and backward displacement vectors, respectively. FIG. 7C shows forward and backward displacement vectors at a fixed position r at times $t_1$ and $t_2$ for two particles (square and round in the figure), where the square particle begins at position 422 (at $t_1$) and ends at position 424 (at $t_2$), and the round particle begins at position 424 (at $t_1$) and ends at position 426 (at $t_2$) in FIG. 7C. If the displacement vector r(t) is defined by a forward or backward vector on image frames 12 at times $t_1$ and $t_2$, the Displacement Vector Invariant (DVI) equation is given by $$\Delta r(r(t_2), t_2) + \Delta r(r(t_2) + \Delta r(r(t_2), t_2), t_1) = 0, \quad (3)$$

or $$\Delta r(r(t_1), t_1) + \Delta r(r(t_1) + \Delta r(r(t_1), t_1), t_2) = 0,$$

and the Conservative Velocity Constraint (CVC) equation is given by $$v(r(t_1) + \Delta v(r(t_1), t_1)\Delta t, t_2) = v(r(t_1), t_1). \quad (4)$$

or $$v(r(t_2), t_2) = v(r(t_1) - v(r(t_2), t_2)\Delta t, t_1),$$

where $\Delta t = t_2 - t_1$.

The DVI equation (3) establishes an implicit function relationship between the forward and backward displacement fields. Both displacement and conservation velocity fields are equivalent based on the definition. According to the definition of the forward and backward displacement vectors $\Delta r(r(t_1), t_1)$ and $\Delta r(r(t_2), t_2)$ in FIGS. 7A and 7B, we have the following equations (5):

$$\Delta r(r(t_1), t_1) = -\Delta r(r(t_2), t_2) \quad (5)$$

$$\begin{cases} \Delta r(r(t_1), t_1) = r(t_2) - r(t_1) = v(r(t_1), t_1)(t_2 - t_1) \\ \Delta r(r(t_2), t_2) = r(t_1) - r(t_2) = v(r(t_2), t_2)(t_1 - t_2). \end{cases}$$

Equations (5) indicate that both the displacement and conservative vectors are equivalent because each vector can be obtained by multiplying and dividing a time different factor $(t_2 - t_1)$ or $(t_1 - t_2)$. The DVI equation (3) indicates that the motion fields at time $t_1$ and $t_2$ are not equal at the same position, but both fields have a shift from each other for moving objects. The shift vector is the displacement vector of the time differences. Equation (3) or (4) establishes an implicit recursive relationship at time $t_1$ and $t_2$ for the displacement vector fields or conservative velocity fields. The inventor has appreciated that since the DVI equation (3) or the CVC equation (4) is a vector equation, the total number of component equations is equal to the number of dimensions of the velocity, and as a result, if one field is given or solved then another corresponding field can be determined by equation (3) or (4) completely.

A fully constrained system of equations 130 can thus be provided in the motion estimator apparatus 100 using the motion compensation concept. The temporal integral form of the conservation constraint equation (2) or the DFD equation indicates that the image at time $t_1$ can be predicted by motion-compensated prediction with an image at time $t_2$ and the displacement field 140 at time $t_1$, thus facilitating interpolation or extrapolation for video coding and/or frame rate up-conversion applications. Also, the image at time $t_2$ can be predicted also with an image at time $t_1$ and the displacement field 140 at time $t_2$. The inventor has thus found that the equation (2) can be described forward and backward at a fixed position based on the displacement fields 140 at different times, $t_1$ and $t_2$.

Assuming that the number of pixels in an image frame 12 is equal to N, the total number of data points is equal to 2×N for an input image sequence 10 having two frames (e.g., frames 12$_{t1}$ and 12$_{t2}$ in FIG. 3 above). A fully constraint nonlinear system of equations 130 using forward and backward DFD equations combined with the DVI equations (4) for resolving the displacement field is thus given by the following equation (6):

$$\begin{cases} FDFD(r, \Delta r(r, t_1)) = I(r + \Delta r(r, t_1), t_2) - I(r, t_1) = 0 \\ BDFD(r, \Delta r(r, t_2)) = I(r, t_2) - I(r + \Delta r(r, t_2), t_1) = 0 \\ DVI = \Delta r(r, t_2) + \Delta r(r + \Delta r(r, t_2), t_1) = 0, \end{cases} \quad (6)$$

where $\Delta r(r, t_1)$ and $\Delta r(r, t_2)$ are the forward and backward displacement fields 140 at a fixed position r as shown in FIG. 7C. Both the FDFD and BDFD equations at a fixed position r are independent for the displacement fields, $\Delta r(r, t_1)$ and $\Delta r(r, t_2)$. The total number of two unknown components of $\Delta r(r, t_1)$ or $\Delta r(r, t_2)$ is equal to 2×N. If one of the fields, $\Delta r(r, t_1)$ and $\Delta r(r, t_2)$, is chosen as an independent motion field, another field can be solved by the DVI equation. The total unknown variables 2×N in equations (6) is equal to the total number of constraint equations (6) and as well as the total number of data points in an image sequence. Therefore, both data points and equations match and provide sufficient data information and constraints to solve the two components of the displacement vector 140 without resort to any additional sum assumptions or constraints.

The forward and backward displacement vectors on two image frames $12_{t1}$ and $12_{t2}$ at times $t_1$ and $t_2$ as shown in FIGS. 7A and 7B are defined by equations (5), and substituting the position vectors $r(t_2)$ and $r(t_1)$ from equations (5) into equation (2) yields the following two equations:

$$\begin{cases} I(r(t_1) + \Delta r(r(t_1), t_1), t_2) - I(r(t_1), t_1) = 0 \\ I(r(t_2), t_2) - I(r(t_2) + \Delta r(r(t_2), t_2), t_1) = 0. \end{cases}$$

Since the above two equations hold for all image scenes, the equations (6) result if all position vectors in above equations are at a fixed position r, and the first and second equations are denoted by FDFD and BDFD. The solution to the inverse problem is therefore based on the motion analysis in physics, the DVI equation, and recognized different displacement fields at time $t_1$ and $t_2$ in both FDFD and BDFD equations. If the forward displacement field is chosen as independent variables, the DVI equations (whether forward DVI equations or backward DVI equations are used) link the FDFD and BDFD equations together for solving the forward two component displacement field.

Using the conservative velocity and CVC equation to replace the displacement vector and DVI equation in (6), a set of fully constrained nonlinear system of equations 130 can be determined for solving the conservative velocity field. Defining a function with discrete variables i and j as $f_{ij}(t)=f(i, j, t)$, the FDFD, BDFD, and the component DVI equations in (6) on a given pixel point i, j are given by the following equations (7) and (8) as the equation set 130:

$$\begin{cases} FDFD_{ij} = I(i + \Delta x_{ij}(t_1), j + \Delta y_{ij}(t_1), t_2) - I_{ij}(t_1) = 0 \\ BDFD_{ij} = I_{ij}(t_2) - I(i + \Delta x_{ij}(t_2), j + \Delta y_{ij}(t_2), t_1) = 0, \end{cases} \quad (7)$$

and $$\begin{cases} \Delta x_{ij}(t_2) + \Delta x(i + \Delta x_{ij}(t_2), j + \Delta y_{ij}(t_2), t_1) = 0 \\ \Delta y_{ij}(t_2) + \Delta y(i + \Delta x_{ij}(t_2), j + \Delta y_{ij}(t_2), t_1) = 0, \end{cases} \quad (8)$$

where $\Delta r_{ij}(t) = (\Delta x_{ij}(t), \Delta y_{ij}(t))^T$. The displacement vector field at time $t_2$ is a function of the field at time $t_1$ based on the DVI equation (8), where the same is true of the backward DVI equations discussed below. There are several available techniques for solving nonlinear systems of equations 130. For example, a damped Newton-Raphson method is an efficient technique, but a converged solution may be facilitated by having a good guess for the initial values, especially for a huge dimensional problem.

Figure 10:
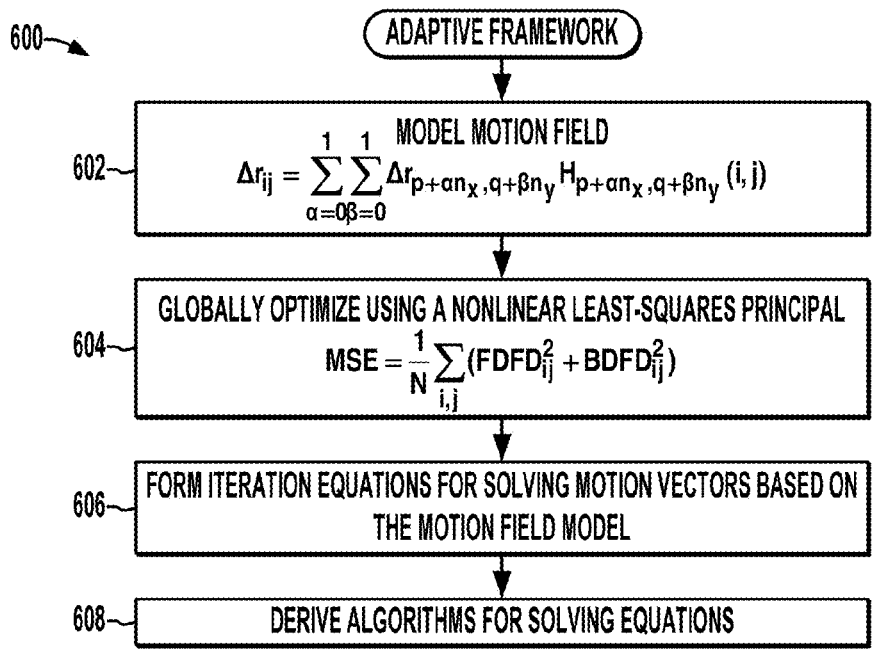
FIG. 10 is a flow diagram illustrating an exemplary adaptive framework for solving a system of equations in accordance with further aspects of the present disclosure.

Referring also to FIG. 10, a unified adaptive framework 600 may be used with simplicity and efficiency for different applications, using techniques to adjust the degree of over-constraint from fully constraint to over-constraint by a block size parameter for solving the nonlinear problem 130. In certain embodiments, the velocity field is expanded by bilinear polynomial functions or two-dimensional B-Spline functions. In order to develop an adaptive framework that allows the estimator to control the resolutions of the displacement field and the degree of over-constraint, and to simplify the computational complexity, bilinear modeling of the displacement field can be used. In general, any two-dimensional function can be approximated by a Lagrange's bilinear function (9):

$$f(x, y) = \sum_{\alpha=0}^{1} \sum_{\beta=0}^{1} f(p + \alpha n_x, q + \beta n_y) H_{p+\alpha n_x, q+\beta n_y}(x, y), \quad (9)$$

where the function $H_{a,b}(x, y)$ is defined by:

$$H_{a,b}(x,y) = \frac{1}{n_x n_y} \begin{cases} (n_x - x + p)(n_y - y + q) & (a = p \cap b = q) \\ (x - p)(n_y - y + q) & (a = p + n_x \cap b = q) \\ (n_x - x + p)(y - q) & (a = p \cap b = q + n_y) \\ (x - p)(y - q) & (a = p + n_x \cap b = q + n_y), \end{cases}$$

and where the parameters of block size $n_x$ and $n_y$ are the sampled spaces of the function f on x and y directions as shown in FIG. 5. The quantized indices p and q are functions of x and y and are given by:

$$\{p, q\} = \{p(x), q(y)\} = \left\{ n_x \left\lfloor \frac{x}{n_x} \right\rfloor, n_y \left\lfloor \frac{y}{n_y} \right\rfloor \right\},$$

where $\lfloor \ \rfloor$ denotes an integer operator. The $\{p, q\}$ serve as tile indices because the integer operator increments them by unity after an additional $n_x$ or $n_y$ pixels are counted.

Figure 8:
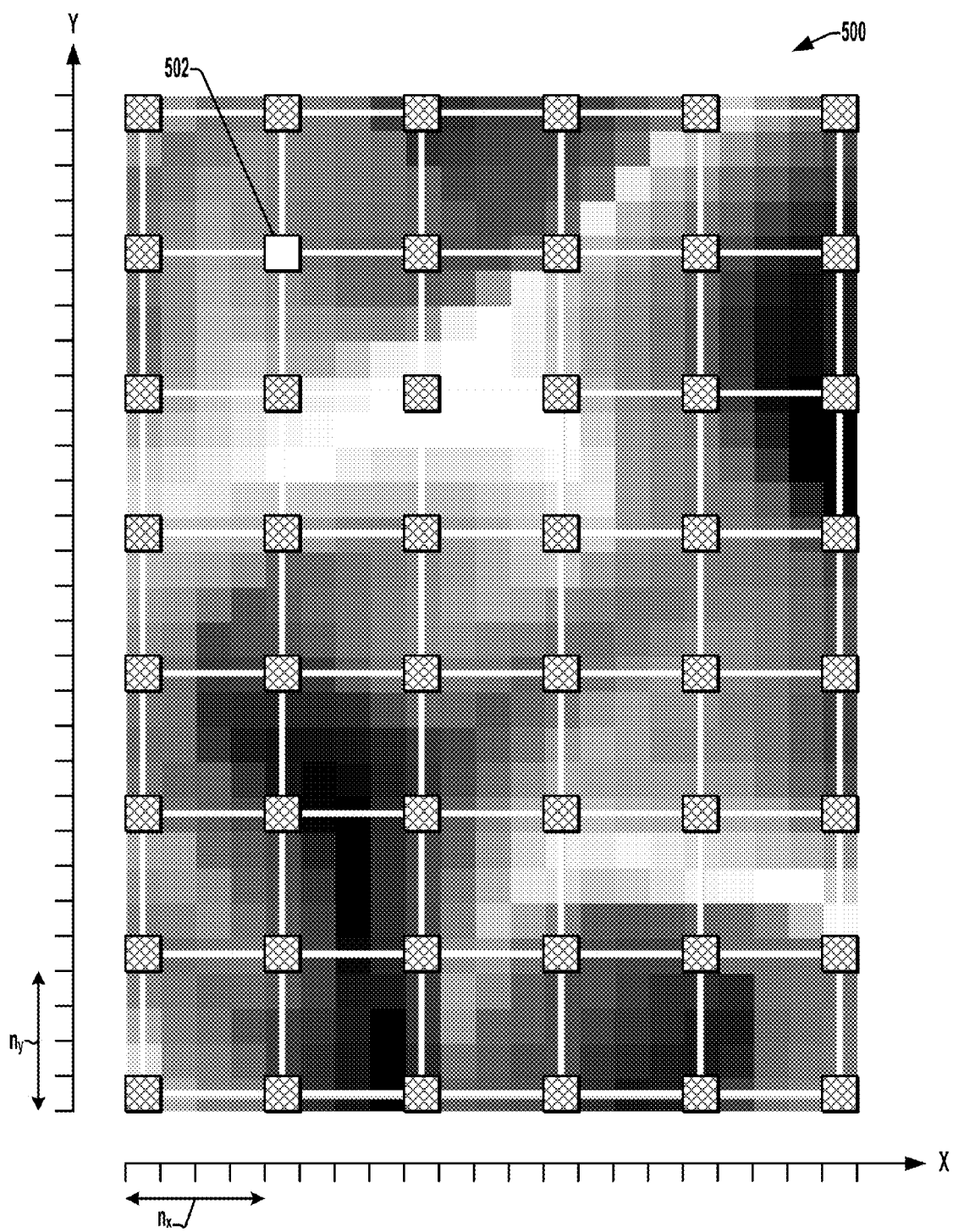
FIGS. 8 and 9 are schematic diagrams illustrating a portion of an exemplary image frame partitioned into blocks.
Figure 9:
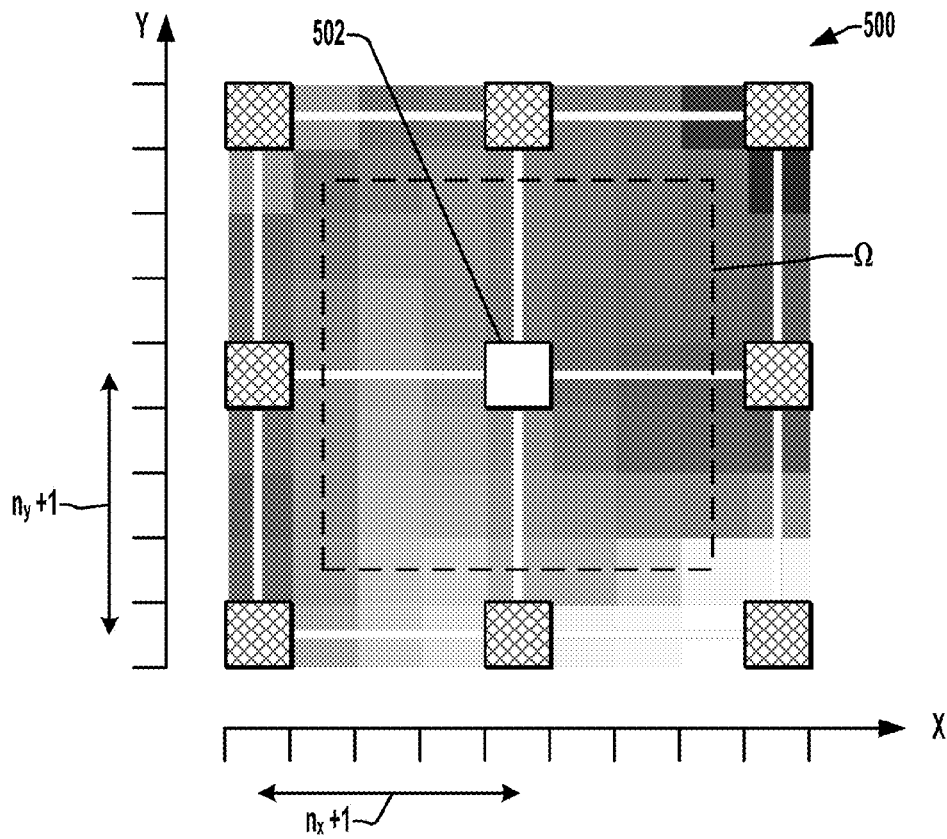

Referring also to FIGS. 8 and 9, in this approach, the image domain 500 is partitioned into a number of sub-domains, or tiles, each which contains an $n_x \times n_y$ array of pixels. In the example of FIGS. 8 and 9, $n=n_x=n_y=4$ pixels per block. Node points (marked with solid squares) of the bilinear approximation are indexed with p and q. As seen in FIG. 9, the pixel locations are partitioned into blocks or tiles with node points 502 at the corners of the blocks (node points 502 indicated as crosshatched or white squares in FIGS. 8 and 9). During the iterations of the process 300, the current value of the block size parameter "n" sets the number of interpolation points $n_x$ and $n_y$ on the "x" and "y" directions, respectively, and FIG. 9 illustrates the blocks in a local domain Ω proximate a particular node 502 in the image 500.

The displacement field is modeled at 602 in the adaptive framework 600 of FIG. 10. Defining a function $f_{ij}(t)=f(i, j, t)$ with discrete variables i and j, the displacement fields $\Delta r_{ij}(t_1)$ are represented as two-dimensional bilinear functions controlled by a smaller number of displacement vector estimates $\Delta r_{pq}(t_1)$ which lie on a coarser node point in grid. The two displacement components in an image scene can be expressed by the following bilinear polynomials:

$$\Delta r_{ij} = \sum_{\alpha=0}^{1} \sum_{\beta=0}^{1} \Delta r_{p+\alpha n_x, q+\beta n_y} H_{p+\alpha n_x, q+\beta n_y}(i, j), \quad (10)$$

where the displacement vector $\Delta r_{ij} = \Delta r_{ij}(t_1) = (\Delta x_{ij}, \Delta y_{ij})$. In the special case when block size is unity ($n_x=n_y=1$), $\Delta r_{ij} = \Delta r_{pq}$ for all indices i and j. All displacement vectors $\Delta r_{ij}$ can be calculated with the bilinear function using the displacement on node points expressed as $\Delta r_{pq}$. Displacement vectors $\Delta r_{ij}$ off-node are no longer independent variables (for over-constrained case: $n=n_x=n_y>1$) except on node points (or a fully constrained case: $n=1$).

In this regard, the block (tile) size parameter $n \geq 1$ can be adjusted to control the number of interpolation points related to the resolution of the displacement field and the degree of the over-constraint. When the parameter n is equal to one, all node points and pixel positions are overlapped together and the system is fully constrained. The system is over-constrained if the parameter n is greater than one.

A nonlinear least-squares model can also be used at 604 in FIG. 10. The displacement field $\Delta x_{pq}$ and $\Delta y_{pq}$ can be resolved when the parameters $n \geq 1$ from the fully or over-constraint system using the nonlinear least-squares model. The presence of possible quantization errors and noise in the intensity measurements suggest the FDFD and BDFD equations in (8) are never identically zero. However, a set of $\Delta r_{ij}$ can be selected for which it is minimized in a least-squares sense. A Mean Square Error (MSE) function that is a sum of the total errors of the FDFD and BDFD in (8) is given by:

$$MSE = \frac{1}{N} \sum_{i,j} (FDFD_{ij}^2 + BDFD_{ij}^2),$$

where the range of i and j are the entire ($N=N_x \times N_y$) image pixel domain ($i \in [0, N_x-1]$, $j \in [0, N_y-1]$, and the weighting factor can be equal to unity in this case). By minimizing the cost function with respect to the displacement components $\Delta x_{kl}$ and $\Delta y_{kl}$ as variables for given indices k and l on all node points, a fully or over-constrained system of equations (11) for the displacement may be written as follows:

$$\sum_{i,j \in \Omega_{kl}} FDFD_{ij} \left\{ \frac{\partial FDFD_{ij}}{\partial \Delta x_{kl}}, \frac{\partial FDFD_{ij}}{\partial \Delta y_{kl}} \right\} + \\ \sum_{i,j \in \Omega_{k'l'}} BDFD_{ij} \left\{ \frac{\partial BDFD_{ij}}{\partial \Delta x_{kl}}, \frac{\partial BDFD}{\partial \Delta y_{kl}} \right\} = 0. \quad (11)$$

In addition, the summation domain is reduced from the entire image plane to only a local region $_{kl}$ or $_{k'l'}$, so that:

$$\sum_{i,j} \to \sum_{i,j \in \Omega_{\alpha\beta}} = \sum_{i=\alpha-n_x+1}^{\alpha+n_x-1} \sum_{j=\beta-n_y+1}^{\beta+n_y-1},$$

where $\alpha=\{k, k'\}$ and $\beta=\{l, l'\}$, and regions of the summation coverage k' and l' are defined by $\{k', l'\}=\{\lfloor k+\Delta x_k \rfloor, \lfloor l+\Delta y_{kl} \rfloor\}$. To obtain equation (14) below, the following is used:

$$\frac{\partial \Delta x_{ij}}{\partial \Delta x_{kl}} = \frac{\partial \Delta y_{ij}}{\partial \Delta y_{kl}} = \sum_{\alpha=0}^{1} \sum_{\beta=0}^{1} H_{kl}(i,j) \delta_{k,p+\alpha n_x} \delta_{l,q+\beta n_y},$$

where $\delta_{ij}$ is the Kronecker-Delta symbol.

Equations (11) obtained by the nonlinear least-squares model are a set of nonlinear system equations with all displacement vectors $\Delta x_{pq}$ and $\Delta y_{pq}$ on node points as variables. To solve the nonlinear system equations (11), an iterative equation can be formulated at 606 in FIG. 10 based on Gauss-Newton and Levenberg-Marquardt methods. The displacement vectors $\Delta x_{kl}$ and $\Delta y_{kl}$ and their surrounding nearest neighbors are the only members now contained in the summations in equation (11). To solve these sparse nonlinear system of equations (11), the FDFD and BDFD can be expanded in a Taylor series using the Gauss-Newton method:

$$\{FDFD_{ij}^{(m+1)}, BDFD_{ij}^{(m+1)}\} \approx \\ \{FDFD_{ij}^{(m)}, BDFD_{ij}^{(m)}\} + + \left\{ \frac{\partial FDFD_{ij}^{(m)}}{\partial \Delta x_{kl}^{(m)}}, \frac{\partial BDFD_{ij}^{(m)}}{\partial \Delta x_{kl}^{(m)}} \right\} \\ (\Delta x_{kl}^{(m+1)} - \Delta x_{kl}^{(m)}) + + \left\{ \frac{\partial FDFD_{ij}^{(m)}}{\partial \Delta y_{kl}^{(m)}}, \frac{\partial BDFD_{ij}^{(m)}}{\partial \Delta y_{kl}^{(m)}} \right\} (\Delta y_{kl}^{(m+1)} - \Delta y_{kl}^{(m)}),$$

where m is a iteration index, and $$\{FDFD_{ij}^{(m)}, BDFD_{ij}^{(m)}\} = \{FDFR_{ij}(\Delta x_{pq}^{(m)}, \Delta y_{pq}^{(m)}), \\ BDFD_{ij}(\Delta x_{pq}^{(m)}, \Delta y_{pq}^{(m)})\}.$$

Utilizing these expansions and the above equations (11), the following iterative equations can be used for all indices k and l:

$$\begin{pmatrix} \Delta x_{kl}^{(m+1)} \\ \Delta y_{kl}^{(m+1)} \end{pmatrix} = \begin{pmatrix} \Delta x_{kl}^{(m)} \\ \Delta y_{kl}^{(m)} \end{pmatrix} - \begin{pmatrix} (\lambda+1)a_{11} & a_{12} \\ a_{12} & (\lambda+1)a_{22} \end{pmatrix}^{-1} \begin{pmatrix} b_1 \\ b_2 \end{pmatrix}, \quad (12)$$

where $$\begin{cases} a_{11} = \sum_{i,j \in \Omega_{kl}} \left( \frac{\partial FDFD_{ij}^{(m)}}{\partial \Delta x_{kl}^{(m)}} \right)^2 + \sum_{i,j \in \Omega_{kl}^{(m)}} \left( \frac{\partial BDFD_{ij}^{(m)}}{\partial \Delta x_{kl}^{(m)}} \right)^2 \\ a_{12} = \sum_{i,j \in \Omega_{kl}} \frac{\partial FDFD_{ij}^{(m)}}{\partial \Delta x_{kl}^{(m)}} \frac{\partial FDFD_{ij}^{(m)}}{\partial \Delta y_{kl}^{(m)}} + \sum_{i,j \in \Omega_{kl}^{(m)}} \frac{\partial BDFD_{ij}^{(m)}}{\partial \Delta x_{kl}^{(m)}} \frac{\partial BDFD_{ij}^{(m)}}{\partial \Delta x_{kl}^{(m)}} \\ a_{22} = \sum_{i,j \in \Omega_{kl}} \left( \frac{\partial FDFD_{ij}^{(m)}}{\partial \Delta y_{kl}^{(m)}} \right)^2 + \sum_{i,j \in \Omega_{kl}^{(m)}} \left( \frac{\partial BDFD_{ij}^{(m)}}{\partial \Delta y_{kl}^{(m)}} \right)^2, \end{cases}$$

$$\begin{cases} b_1 = \sum_{i,j \in \Omega_{kl}} FDFD_{ij}^{(m)} \frac{\partial FDFD_{ij}^{(m)}}{\partial \Delta x_{kl}^{(m)}} + \sum_{i,j \in \Omega_{kl}^{(m)}} BDFD_{ij}^{(m)} \frac{\partial BDFD_{ij}^{(m)}}{\partial \Delta x_{kl}^{(m)}} \\ b_2 = \sum_{i,j \in \Omega_{kl}} FDFD_{ij}^{(m)} \frac{\partial FDFD_{ij}^{(m)}}{\partial \Delta y_{kl}^{(m)}} + \sum_{i,j \in \Omega_{kl}^{(m)}} BDFD_{ij}^{(m)} \frac{\partial BDFD_{ij}^{(m)}}{\partial \Delta y_{kl}^{(m)}}, \end{cases}$$

$$\sum_{i,j \in \Omega_{kl}^{(m)}} = \sum_{i=k^{(m)}-n_x+1}^{k^{(m)}+n_x-1} \sum_{j=l^{(m)}-n_y+1}^{l^{(m)}+n_y-1},$$

and $$\{k^{(m)}, l^{(m)}\} = \{\lfloor k + \Delta x_{kl}^{(m)} \rfloor, \lfloor l + \Delta y_{kl}^{(m)} \rfloor\}.$$

The parameter $\lambda \geq 0$ is a Levenberg-Marquardt factor that is adjusted at each iteration to guarantee that the MSE is convergent. A smaller value of the factor $\lambda$ can be used, bringing the algorithm closer to the Gauss-Newton method with second order convergence. This Levenberg-Marquardt method can improve converge properties greatly in practice and has become the standard of nonlinear least-squares routines.

All displacement vectors $\Delta x_{pq}$ and $\Delta y_{pq}$ on node points can be obtained by iterating the equations in (12), and the displacement vectors $\Delta x_{ij}$ and $\Delta y_{ij}$ off node points (for n>1) can be calculated by the bilinear functions in (10). Ultimately, all displacement vectors $\Delta r$ can be determined, and an optimum solution can be achieved over the large-scale image. In addition, the block size parameter n≥1 can be adjusted to control the number of interpolation points within a tile, to resolve the displacement field, and to control the degree of the over-constraint.

An optimized motion-compensated predication is also possible. In particular, using an additionally constrained system to estimate motion field, the inverse problem has previously been addressed by minimizing an objective function with a weighting (penalty) parameter. However, there are two major issues with this use of a weighting parameter. The first is the determination of the optimized weighting parameter, and several different values of the weighting parameter have been proposed. However, it is difficult to find a single optimal value of the parameter for realistic applications if the ground truth flow field is unknown. The second issue is that the Peak Signal-to-Noise Ratio (PSNR):

$$PSNR = 10\log_{10}\left(\frac{255^2}{MSE}\right),$$

is not optimized by minimizing the objective function with the weighting parameter. The estimated flow field by this approach cannot always lead to an optimal Motion-Compensated prediction or Interpolation (MCI) image for applications of video compression.

As seen above, however, the iteration equations (12) are derived based on the least-squares principle that leads directly to a solution of the displacement field 140 with a minimized target function MSE or a maximized PSNR (An average PSNR for the Forward and Backward MCP (FMCP and BMCP)). Since both FDFD and BDFD are equivalent physical quantities, the target function PSNR is an optimized function without any additional parameters. Therefore the MCP image using the estimated displacement field 140 based on the fully constrained system 130 is believed to be optimized.

The adjustable block size approach using smaller number of displacement components on nodes to interpolate a full density displacement field 140 (for n>1 case) provides a powerful capability for different applications in both computer vision and remote sensing fields. If the block size shown in FIG. 8 is n×n with dimension $N_x \times N_y$ images, then the number of transmitted or stored motion vectors for both proposed and block-matching is estimators are equal to $[(N_x-1)/n+1] \times [(N_y-1)/n+1]$ and $(N_x/n) \times (N_y/n)$, respectively. Using almost the same number of the displacement vectors $\Delta r$ in a fixed block size for both approaches, the current framework (the displacement field with $C^1$ continuity obtained by global optimal strategies) can provide much higher accurate performance than the block-matching algorithm (the displacement field with $C^0$ continuity obtained by local searching strategies) which is the currently adopted standard for video coding.

With respect to iteration algorithms, certain embodiments of the process 300 and apparatus 100 can start from a set of preset initial values of the displacement field $\Delta r^{(0)}$ at time $t_1$, then the Motion Vector Solver 110b solves the correspondence field $\Delta r^{(0)}(t_2)$ using all the component equations (8) numerically. An iteration step based on these two displacement fields at time $t_1$ and $t_2$ and the iterative equations in (12) can be performed. Furthermore, employing a principle similar to that of the Gauss-Seidel iteration algorithm, updated values of $\Delta x_{pq}^{(m)}$ and $\Delta y_{pq}^{(m)}$ can be used on the right-hand side of equation (12) as soon as they become available during the iteration processing. In certain embodiments, all initial displacement field vectors are preset to be equal to 0.01, and the initial Levenberg-Marquardt factor $\lambda$ is set to 0.001 and is multiplied by ten in each step if the iteration is not convergent.

The FDFD and BDFD equations on each pixel include two motion-compensated predictions $I(i \pm \Delta x_{ij}, j \pm \Delta y_{ij}, t_{\{2,1\}})$ with variables that may be out of the position on pixels in an image scene. In order to compute the motion-compensated predictions, the general bilinear interpolation function in (4) is utilized for this computation as follows:

$$I(i \pm \Delta x_{ij}, j \pm \Delta y_{ij}, t_{\{2,1\}}) = \sum_{\alpha=0}^{1} \sum_{\beta=0}^{1} I_{p+\alpha,q+\beta}(t_{\{2,1\}}) H_{p+\alpha,q+\beta}(i \pm \Delta x_{ij}, j \pm \Delta y_{ij}),$$

where the function H is evaluated when $n_x = n_y = 1$, and $\{p, q\}$ $\{p(i \pm \Delta x_{ij}), q(j \pm \Delta_{ij})\}$.

The proposed displacement estimation approach leads to a nonlinear system of equations that may have multiple solutions depending on texture morphology in an image sequence. For example, to estimate a displacement field within a featureless region, the displacement field may not be unique because the initial and final positions of a particular particle cannot be physically determined. Even in a texture-rich environment, the realistic motion fields may have multiple possibilities, which satisfy the same equations and are consistent with the same physical observation. The multiple solutions in the inverse problem by solving a nonlinear system are congruent with this physical property.

The inventor has further appreciated that in order to approach a globally minimized solution using the iteration equations (12), an algorithm of PROC that adapts a variable resolution of the displacement structure during the iterations can be employed in this algorithm. In certain embodiments, an initial block size parameter $n_0$ is selected to be greater than a preset value of the block size n at initial iteration, and it reaches a preset value of n at the end iteration. In certain embodiments, the displacement field can be regularized by changing the block size parameter n from a larger value (higher degree of over-constraint) to a smaller one (lower degree of over-constraint) by one every Nth iteration until it approaches a preset value of n. The inventor has appreciated that the PROC algorithm is helpful for seeking a flow field in which each vector is consistent with its neighbors.

As seen in FIGS. 4 and 5 above, either forward or backward DVI equations can be used in the equation set 130. Algorithms are then derived at 608 in FIG. 9 for solving the DVI equations. Two components of forward and backward DVI equations between time $t_1$ and $t_2$ are given by the following equations (A1) and (A2):

$$\begin{cases} \Delta x_{ij}(t_2) + \Delta x(i + \Delta x_{ij}(t_2), j + \Delta y_{ij}(t_2), t_1) = 0 \\ \Delta y_{ij}(t_2) + \Delta y(i + \Delta x_{ij}(t_2), j + \Delta y_{ij}(t_2), t_1) = 0, \end{cases} \quad (A1)$$

and

-continued $$\begin{cases} \Delta x(x, y, t_1) + \Delta x(x + \Delta x(x, y, t_1), y + \Delta y(x, y, t_1), t_2) = 0 \\ \Delta y(x, y, t_1) + \Delta y(x + \Delta x(x, y, t_1), y + \Delta y(x, y, t_1), t_2) = 0. \end{cases} \quad (A2)$$

If the conservative velocity field $\{\Delta x_{ij}(t_1), \Delta y_{ij}(t_1)\}$ at time $t_1$ is given or solved, then the correspondence field $\{\Delta x_{ij}(t_2), \Delta y_{ij}(t_2)\}$ at time $t_2$ can be determined (or vice versa) by all component equations in (A1) or (A2). Thus, the processor 110 of the estimator 100 is programmed to solve the equation set 130 using the forward and backward displaced frame difference equations in combination with either the forward DVD equations (A1) (FIG. 4) or the backward DVD equations (A2) (FIG. 5) using the first and second image frames $12_{t1}$ and $12_{t2}$ to estimate the displacement field 140 describing displacement vectors $\Delta r_{ij}(t_1)$ or $\Delta r_{ij}(t_2)$ for pixel locations (i, j) at one of the first and second times $(t_1, t_2)$ using known or estimated displacement field values at the other of the first and second times $(t_1, t_2)$.

In one example, numerically solving the equation set 130 at time $t_2$ using equations (A1) or (A2) by the Motion Vector Solver 110b if the velocity $\{\Delta x_{ij}(t_1), \Delta y_{ij}(t_1)\}$ or $\{\Delta x_{ij}(t_2), \Delta y_{ij}(t_2)\}$ are given involves expanding the field by a bilinear polynomial function, where a bilinear expression of a two-dimensional displacement field is given by equation (10).

The forward and backward DVI equations (A1) and (A2) are implicit recursive functions of the fields $(\{\Delta x_{ij}(t_1), \Delta y_{ij}(t_1)\})$ at time t and $t_1$. Three methods for solving the matrix field $\{\Delta x_{ij}(t_2), \Delta y_{ij}(t_2)\}$ are described below for the case in which the matrix field $\{\Delta x_{ij}(t_1), \Delta y_{ij}(t_1)\}$ are given, and it will be appreciated that the converse problem can be solved by similar techniques for solving the equation set 130 at time $t_1$ where the matrix field is given at time $t_2$.

An interpolation method with a searching algorithm can be used to solve the equation set 130 using either of the forward DVI equations (FIG. 4) or the backward DVI equations (FIG. 5). In this approach, a lookup table of offsite velocity field at time t with variables that are out of the position on pixels (x≠i and y≠j) in an image is generated using the given matrix field $\{\Delta x_{ij}(t_1), \Delta y_{ij}(t_1)\}$. The lookup table in one example is an array of records, where each record contains four parameters: position coordinates $x=i+\Delta x_{ij}(t_1)$ and $y=j+\Delta y_{ij}(t_1)$, and the matrix values of $\Delta x_{ij}(t_1)$ and $\Delta y_{ij}(t_1)$ for all $i \in [0, N_x-1] \cap j \in [0, N_y-1]$. All the values of the matrix field $\Delta x_{ij}(t_2)$ and $\Delta y_{ij}(t_2)$ on the pixel points are then evaluated by a bilinear interpolation method and a searching algorithm. The searching algorithm finds three or four available values of the field $\Delta x(x, y, t_2)$ and $\Delta y(x, y, t_2)$ in the lookup table for all nearest points around the given point (i, j).

Another technique involves solving the forward DVI equations (A1) by Newton-Raphson method, such as a damped Newton-Raphson method. Assuming that the forward DVI equations (A1) are nonlinear functions with variables $\Delta x_{ij}(t_2)$ and $\Delta y_{ij}(t_2)$, the system of equations 130 can be solved by a Newton-Raphson method. Two-component nonlinear system of equations with variable $\Delta x_{ij}(t_2)$ and $\Delta y_{ij}(t_2)$ are given by:

$$\begin{cases} \varepsilon_1(\Delta x_{ij}(t_2), \Delta y_{ij}(t_2)) = \Delta x_{ij}(t_2) + \Delta x(i + \Delta x_{ij}(t_2), j + \Delta y_{ij}(t_2), t_1) = 0 \\ \varepsilon_2(\Delta x_{ij}(t_2), \Delta y_{ij}(t_2)) = \Delta y_{ij}(t_2) + \Delta y(i + \Delta x_{ij}(t_2), j + \Delta y_{ij}(t_2), t_1) = 0. \end{cases}$$

Using the bilinear function in the above equation (A3) to expand the given field at time $t_1$, all off site values (with non-integer value variables) of the given field at time $t_1$ are evaluated by the function (10). Since both indexes p and q are functions of the variables $\Delta x_{ij}(t_2)$ and $\Delta y_{ij}(t_2)$, the variables $\Delta x_{ij}(t_2)$ and $\Delta y_{ij}(t_2)$ cannot be solved directly from the above equations. However, these equations are quasi-quadratic, and thus can be solved by a damped Newton-Raphson method. Iteration equations for solving the matrix field at time t for all i and j are given by:

$$\begin{pmatrix} \Delta x_{ij}^{(m+1)}(t_2) \\ \Delta y_{ij}^{(m+1)}(t_2) \end{pmatrix} = \begin{pmatrix} \Delta x_{ij}^{(m)}(t_2) \\ \Delta y_{ij}^{(m)}(t_2) \end{pmatrix} - \begin{pmatrix} \frac{\partial \varepsilon_1^{(m)}}{\partial \Delta x_{ij}^{(m)}(t_2)} & \frac{\partial \varepsilon_1^{(m)}}{\partial \Delta y_{ij}^{(m)}(t_2)} \\ \frac{\partial \varepsilon_2^{(m)}}{\partial \Delta x_{ij}^{(m)}(t_2)} & \frac{\partial \varepsilon_2^{(m)}}{\partial \Delta y_{ij}^{(m)}(t_2)} \end{pmatrix}^{-1} \begin{pmatrix} \varepsilon_1^{(m)} \\ \varepsilon_2^{(m)} \end{pmatrix}, \quad (A3)$$

where m is an iteration index. All derivatives with respect variables $\Delta x_{ij}(t_2)$ and $\Delta y_{ij}(t_2)$ in the above equations can be evaluated by the bilinear function (10). Two index variables p and q in function (10) are integer function of the variables $\Delta x_{ij}(t_2)$ and $\Delta y_{ij}(t_2)$, but the derivative of the integer function is equal to zero, and thus:

$$\begin{cases} \frac{\partial \Delta x_{pq}(t_1)}{\partial \Delta x_{ij}^{(m)}(t_2)} = \frac{\partial \Delta x_{pq}(t_1)}{\partial \Delta y_{ij}^{(m)}(t_2)} \equiv 0 \\ \frac{\partial \Delta y_{pq}(t_1)}{\partial \Delta x_{ij}^{(m)}(t_2)} = \frac{\partial \Delta y_{pq}(t_1)}{\partial \Delta y_{ij}^{(m)}(t_2)} \equiv 0. \end{cases}$$

A third approach can be used to solve equation set 130 employing the backward DVD equations (A2) (FIG. 5) by a New-Raphson method. In order to solve the velocity field $\Delta x_{ij}(t_2)$ and $\Delta y_{ij}(t_2)$ in equation (A2), the equation can be rewritten as shown in the following equation (A4):

$$\begin{cases} \Delta x(x_1, y_1, t_1) + \Delta x(x_1 + \Delta x(x_1, y_1, t_1), y_1 + \Delta y(x_1, y_1, t_1), t_2) = 0 \\ \Delta y(x_1, y_1, t_1) + \Delta y(x_1 + \Delta x(x_1, y_1, t_1), y_1 + \Delta y(x_1, y_1, t_1), t_2) = 0. \end{cases} \quad (A4)$$

where $x_1$ and $y_1$ are two components of a position vector. Two new index variables are introduced as follows:

$$\begin{cases} i = x_1 + \Delta x(x_1, y_1, t_1) \\ j = y_1 + \Delta y(x_1, y_1, t_1), \end{cases} \quad (A5)$$

or $$\begin{cases} e_1 = x_1 + \Delta x(x_1, y_1, t_1) - i = 0 \\ e_2 = y_1 + \Delta y(x_1, y_1, t_1) - j = 0 \end{cases}.$$

The above equations become:

$$\begin{cases} \Delta x_{ij}(t_2) = -\Delta x(x_1, y_1, t_1) \\ \Delta y_{ij}(t_2) = -\Delta y(x_1, y_1, t_1). \end{cases} \quad (A6)$$

All the displacement vector fields $\Delta x_{ij}(t_2)$ and $\Delta y_{ij}(t_2)$ in equation (A6) on all pixel points (i, j) can be determined by off-site field at time $t_1$ after all position coordinates $x_1$ and $y_1$ are solved from equations (A5). According to the bilinear expansion in equation (A3), the displacement field at time $t_1$ can be expressed by:

$$\{\Delta x(x, y, t_1), \Delta y(x, y, t_1)\} =$$

$$\sum_{\alpha=0}^{1} \sum_{\beta=0}^{1} \{\Delta x_{p+\alpha n_x, q+\beta n_y}(t_1), \Delta y_{p+\alpha n_x, q+\beta n_y}(t_1)\} H_{p+\alpha n_x, q+\beta n_y}(x, y).$$

Iterative equations for solving position coordinate $x_1$ and $y_1$ are given by $$\begin{pmatrix} x_1^{(m+1)} \\ y_1^{(m+1)} \end{pmatrix} = \begin{pmatrix} x_1^{(m)} \\ y_1^{(m)} \end{pmatrix} - \begin{pmatrix} \frac{\partial e_1^{(m)}}{\partial x_1^{(m)}} & \frac{\partial e_1^{(m)}}{\partial y_1^{(m)}} \\ \frac{\partial e_2^{(m)}}{\partial x_1^{(m)}} & \frac{\partial e_2^{(m)}}{\partial y_1^{(m)}} \end{pmatrix}^{-1} \begin{pmatrix} e_1^{(m)} \\ e_2^{(m)} \end{pmatrix}.$$

Using the property of the integer function that the derivative is zero yields:

$$\begin{cases} \frac{\partial \Delta x_{pq}}{\partial x_1} = \frac{\partial \Delta x_{pq}}{\partial y_1} \equiv 0 \\ \frac{\partial \Delta y_{pq}}{\partial x_1} = \frac{\partial \Delta y_{pq}}{\partial y_1} \equiv 0. \end{cases}$$

All position coordinate $x_1$ and $y_1$ for given indexes i and j, and the displacement field at time $t_1$ can be solved by only a few iteration steps, because these equations are quasi-quadratic for this motion model.

In certain implementations, the Motion Vector Solver 110$b$ is programmed to solve the forward displacement vector invariant equations (FIG. 4) in the equation set 130 by a damped Newton-Raphson method using the above iteration equations (A3) for solving the displacement field at time $t_2$.

Figure 11:
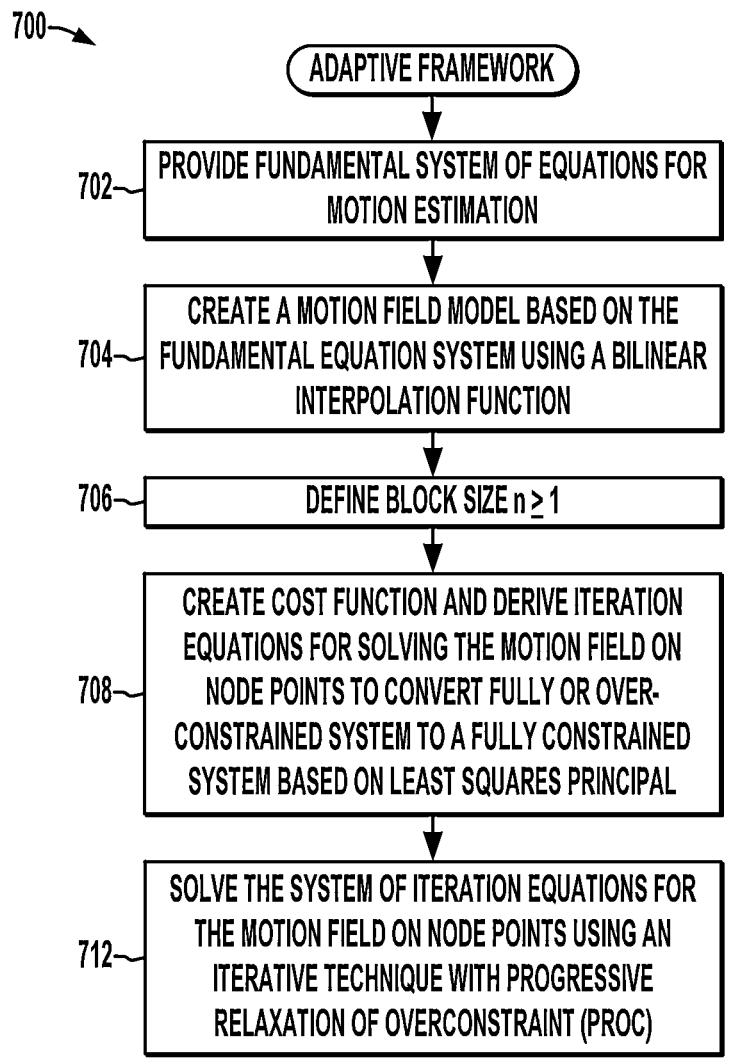
FIG. 11 is a detailed flow diagram illustrating an adaptive process or framework for solving a system of equations for motion estimation in accordance with further aspects of the present disclosure.

Referring now to FIG. 11, an adaptive framework or process 700 is illustrated for solving a system of equations for motion estimation in accordance with further aspects of the present disclosure. At 702 in FIG. 11, a fundamental system of equations is provided for motion estimation. The process 700 can be used for motion estimation equation systems that are linear or nonlinear, and can be applied where the fundamental motion estimation equation system is under-constrained, over-constrained and/or fully constrained. Moreover, process 700 can be used for estimating any type or form of motion field, including without limitation displacement fields and/or velocity fields. For instance, the fundamental system can be provided at 702 as the DFD equations discussed above, or the fundamental equation system can be provided in the form of optical flow equations or heat flow equations and other nonlimiting embodiments. Modeling is then performed at 704, in which a motion field model is created based on the fundamental equation system using a bilinear interpolation function (e.g., 134 above). In this regard, the inventor has appreciated that for each pixel in an image, there may be one equation, or there may be two or more equations, and that motion vectors at individual pixel points are dependent upon motion vectors for neighboring node points. At 706 in FIG. 11, the block size is defined, where "n" is set to an integer value greater than or equal to 1 so that the number of motion vectors on node points is greater than the number of pixel points. In this manner, motion vectors on node points can be solved without solving all the motion fields for each pixel point.

Thus the motion field for node points can be solved using the model (bilinear interpolation function). At 708 a cost function is created based on a linear or nonlinear least-squares principle. In addition, iteration equations are derived at 708 for solving the motion field on node points to convert a fully or over-constrained system to a fully constrained system based on a linear or nonlinear least-squares principle. In this regard, the fundamental equation system at 702 may be over-constrained, fully constrained and/or under-constrained, but the modeling at 704 causes the modeled motion field system to be fully constrained or over-constrained based on the block size definition at 706. Moreover, the inventor has appreciated that using the nonlinear least squares technique at 708, a fully constrained system of iteration equations can be created or derived for solving the motion field on node points, for example, using a Gauss-Newton method or Levenberg-Marquardt technique, where the iteration equations are based on the fundamental equation system provided at 702. At 712, the system of iteration equations is solved for the motion field on node points using an iterative technique with progressive relaxation of over-constraint (PROC), for instance, using a processor.

In an alternative exemplary embodiment of the invention, a method for processing an image sequence can include an under-constrained system with a symmetric displaced frame difference equation (SDFD).

As noted herein, there can be numerous local minima in image data applications when the nonlinear model is used to deal with a problem of global nonlinear minimization with huge number of unknown parameters. A convergent solution can depend on having a good guess for the initial values, especially for huge dimensional problem. However, in an exemplary embodiment of the invention, to avoid obtaining a specious local minimum solution when solving a nonlinear problem using the initial guess far away from the real flow field, a SDFD equation with only half displacement parameters used for resolving the total displacement field can be utilized.

Figure 12:
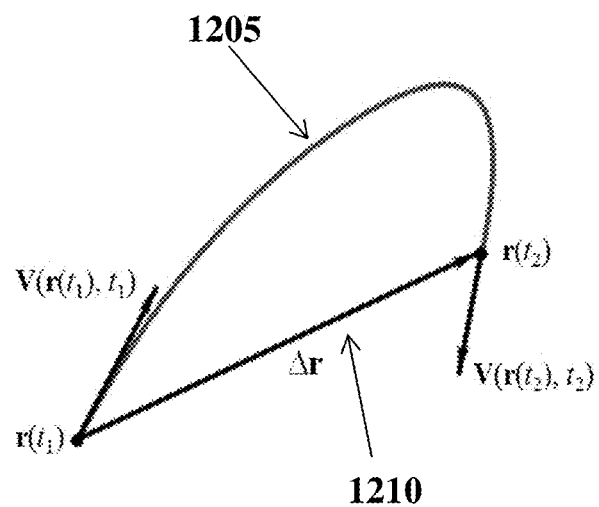
FIG. 12 is a plot of a motion particle trajectory, instant velocities at time $t_1$ and $t_2$, and a displacement vector between initial and final positions at time $t_1$ and $t_2$.

The estimated motion vector from two successive images is a displacement vector (or average velocity in the time interval) between the initial and final positions of a particle in the scene as shown in FIG. 12. FIG. 12 is a plot of a motion particle trajectory, instant velocities at time $t_1$ and $t_2$, and a displacement vector between initial and final positions at time $t_1$ and $t_2$. The trajectory represented by the curved, upper portion 1205 in FIG. 12 shows a very complex motion for a real particle for a longer temporal range. The motion fields discussed herein are displacement fields or their equivalent average velocity fields defined by $\bar{v}(r(t), t) = \Delta r(r(t), t)/\Delta t$, where $\Delta r$ and $\Delta t = t_2 - t_1$ are the displacement vector and a time difference between image frames at time $t_1$ and $t_2$. We denote the average velocity by $v = \bar{v}$ as the estimated velocity in this paper for convention.

The motion field estimated from successive NOAA Advanced Very High Resolution Radiometer (AVHRR) images or ocean-color imagery spaced several hours apart, and the field is relevant to the important question of surface (or near-surface) drift velocity. For example, one application of this would be the drift of pollution (e.g., an oil plume).

The image intensity $I(r, t)$ measured by brightness (optical flow from visible band images) or temperature (heat flow from thermal images) can be a scalar function of position coordinates $r(t)$ and time t. A brightness or tracer conservation constraint equation can be as follows:

$$\frac{dI(r(t),t)}{dt} = \left(\frac{\partial}{\partial t} + v \cdot \nabla\right) I(r(t), t) = 0 \quad \text{(B1)}$$

where operator $$\frac{d}{dt}$$

denotes a total derivative with respect to time t. The differential form of equation (B1) can be linear in the velocity components and can hold only for infinitesimal or nearly infinitesimal motions. Using two successive frames, an estimate of partial derivatives with respect to time in (B1) can be made; however, equation (B1) may not exactly describe the motion between the two successive frames, especially for large-scale displacement motion.

In order to constrain the image scenes at time $t=t_1$ and $t=t_2$, equation (B1) can be integrated from time $t_1$ to $t_2$ $$\int_{t_1}^{t_2} \frac{dI(r(t),t)}{dt} dt = I(r(t_2), t_2) - I(r(t_1), t_1) \equiv 0 \quad \text{(B2)}$$

where $r(t_1)$ and $r(t_2)$ can be the position vectors at time $t_1$ and $t_2$.

In order to estimate a motion field with as small a displacement magnitude as possible, a half displacement vector $\Delta r_h = \Delta r/2 = v \Delta t_h$ can be defined along the total displacement vector 1210 as shown in FIG. 12, where $\Delta t_h = \Delta t/2$, and $v = \bar{v}(r(t_1 + \Delta t_h), t_1 + \Delta t_h)$ can be the average velocity between $t_1$ and $t_2$ at position $r(t_1 + \Delta t_h)$. The initial and final position vectors can be expressed by $$\begin{cases} r(t_1) = r(t_1 + \Delta t_h) - v\Delta t_h \\ r(t_2) = r(t_1 + \Delta t_h) + v\Delta t_h. \end{cases}$$

Substituting the position vectors in the above equations into equation (B2), the symmetric displaced frame difference (SDFD) equation can be given by $$\text{DFCD} = I(r(t_1+\Delta t_h) + v\Delta t_h, t_2) - I(r(t_1+\Delta t_h) - v\Delta t_h, t_1) = 0 \quad \text{(B3)}$$

The conservation constraint equation (B1) can be integrated into path-independent equation (B3) and all terms in equation (B3) associate with intensity at time $t_1$ and $t_2$. It can be clear that employing the SDFD equation (B3) for motion estimations can achieve higher accuracy in comparison with the heat or optical flow equation (B1) especially for large scale displacement estimation. Since the estimated displacement vectors within the terms in equation (B3) are only half of the total displacement vector, convergence to a global optimal solution can be more robust than when the total displacement vector is estimated by an iteration algorithm.

The intensity terms at time $t_1$ and $t_2$ in equation (B3) can be calculated from the intensity fields on the image sequence. The inverse problem for solving the velocity vector is under-constrained because two unknown velocity components must be derived from a single SDFD equation (B3) at each of these pixel points.

Figure 13:
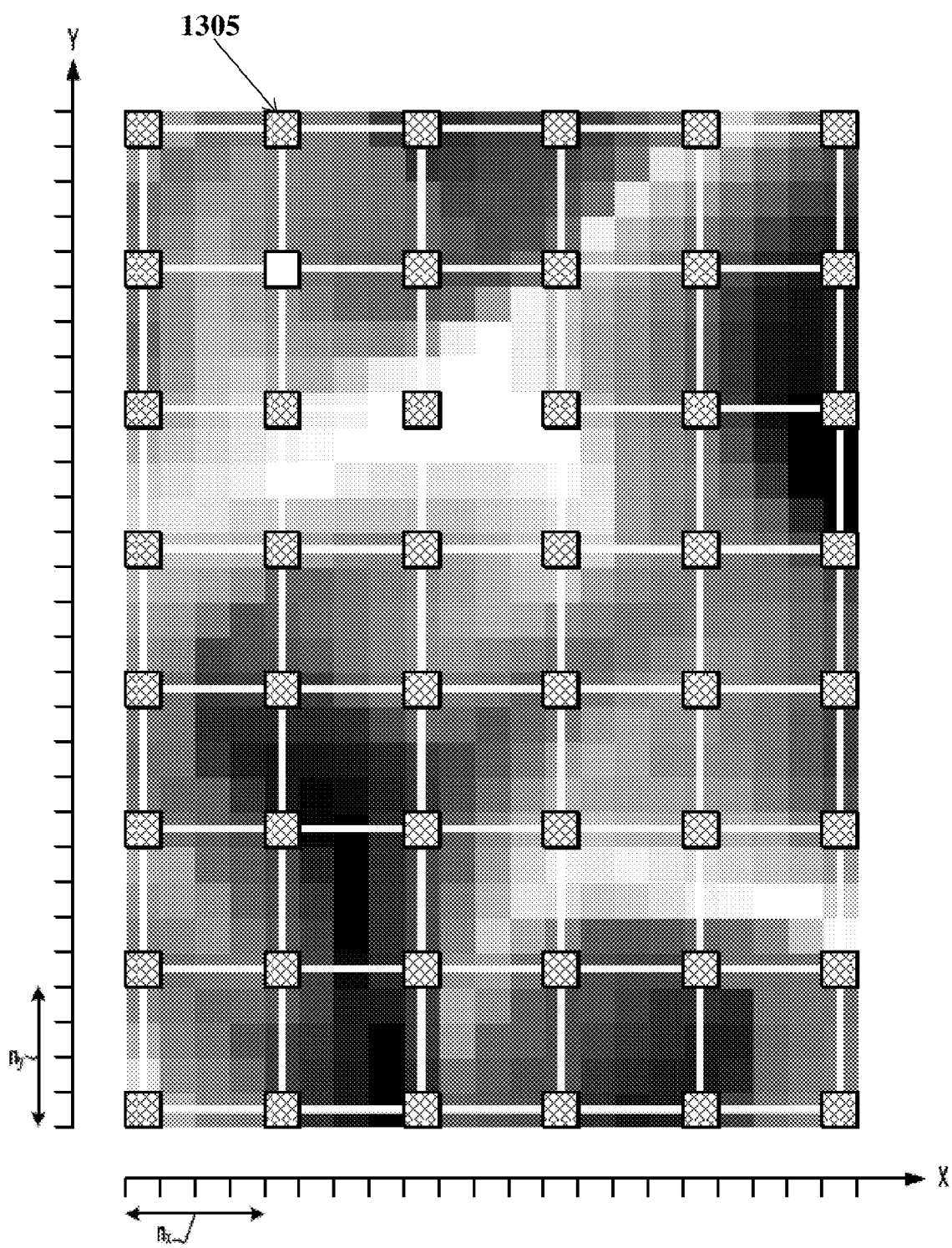
FIG. 13 is a coarser node point in grid.

In an exemplary embodiment of the invention, one of the efficient approaches for resolving the velocity field from the under-constrained system can be to express the velocity field as bilinear polynomial functions or two-dimensional B-Splines functions. Bilinear modeling of the displacement field can be utilized to develop a unified adaptive framework that can allow the estimator to control the resolutions of the displacement field and the degree of over-constraint, and to simplify the computational complexity. The velocity fields u(x, y, t) and v(x, y, t) can be represented as two-dimensional bilinear functions controlled by a smaller number of velocity estimates u(p, q, t) and v(p, q, t) which can lie on a coarser node point in grid as shown in FIG. 13. In FIG. 13, the node points (the small squares, see e.g., 1305, and block size $n_x = n_y = 4$) of the bilinear polynomial functions with indices p and q are mapped on an image scene. All function values of off-node when $i \neq p(i)$ and $j \neq q(j)$ in the image plane can be calculated based on the sampled function values on node points when $i = p(i)$ and $j = q(j)$.

In general, any two-dimensional function can be approximated by a Lagrange's bilinear function $$f(x,y) = \sum_{\alpha=0}^{1} \sum_{\beta=0}^{1} f(p + \alpha n_x, q + \beta n_y) H_{p+\alpha n_x, q+\beta n_y}(x, y) \quad \text{(B4)}$$

where function $H_{a,b}(x, y)$ can be the bilinear forms. The image domain can be partitioned into sub-domains, or tiles, each of which can contain an $n_x \times n_y$ array of pixels as represented in FIG. 13. The quantized indices p and q are functions of x and y and can be given by $$\{p, q\} = \{p(x), q(y)\} = \left\{n_x \left\lfloor \frac{x}{n_x} \right\rfloor, n_y \left\lfloor \frac{y}{n_y} \right\rfloor\right\},$$

where $\lfloor \ \rfloor$ denotes an integer operator. The $\{p, q\}$ serve as tile indices, since the integer operator increments them by unity after an additional $n_x$ or $n_y$ pixels are counted. The bilinear function $H_{a,b}(x, y)$ can be defined by $$H_{a,b}(x, y) = \frac{1}{n_x n_y} \begin{cases} (n_x - x + p)(n_y - y + q) & (a = p \cap b = q) \\ (x - p)(n_y - y + q) & (a = p + n_x \cap b = q) \\ (n_x - x + p)(y - q) & (a = p \cap b = q + n_y) \\ (x - p)(y - q) & (a = p + n_x \cap b = q + n_y). \end{cases} \quad \text{(B5)}$$

The two component velocity fields on pixels in an image can be approximated by the following discrete forms of the bilinear approximation functions with first order continuity that holds for all $N = N_x \times N_y$ image globally $$v_{ij} = \sum_{\alpha=0}^{1} \sum_{\beta=0}^{1} v_{p+\alpha n_x, q+\beta n_y} H_{p+\alpha n_x, q+\beta n_y}(i, j), \quad \text{(B6)}$$

where a function with discrete variables i and j can be denoted by $v_{ij} = v_{ij}(t) = v(i, j, t)$ or $f_{ij}(t) = f(i, j, t)$. In a special case, $v_{ij}$ can be equal to $v_{pq}$ for all indices i and j when block size parameter n is unity ($n = n_x = n_y = 1$).

All off-node velocities can be calculated by equation (B6) using the on-node velocities expressed as $u_{pq}$ and $v_{pq}$. The SDFD equation in (B3) can become $$\text{DFCD}_{ij} = I(i + u_{ij} \Delta t_h, j + v_{ij} \Delta t_h, t_2) + - I(i - u_{ij} \Delta t_h, j - v_{ij} \Delta t_h, t_1) = 0, \quad \text{(B7)}$$

where $u_{ij}$ and $v_{ij}$ are two components of velocities on each pixel with horizontal and vertical indices $\{i, j\}$ for the whole image. The SDFD in (B7) is a function of variables of two velocity components that depend on node point velocities in (B6), i.e.

$$DFCD_{ij} = DFCD_{ij}(u_{ij}, v_{ij}) = DFCD_{ij}(u_{pq}, v_{pq}).$$

The SDFD equations (B3) and (B7) are equivalent only when the block size parameters $n_x=1$ and $n_y=1$, in this case, $p=i$ and $q=j$. All independent $SDFD_{ij}$ equations have only a smaller number of the independent velocities on nodes when the velocity indices $i=p(i)$ and $j=q(j)$. The total number of SDFD equations is $N=N_x \times N_y$ for an $N_x \times N_y$ image sequence. The number of node points shown in FIG. 2 is given by $$N_{node} = \left(\left\lfloor \frac{N_x - 1}{n_x} \right\rfloor + 1\right)\left(\left\lfloor \frac{N_y - 1}{n_y} \right\rfloor + 1\right).$$

The total number of independent velocity fields with two components $u_{pq}$ and $v_{pq}$ is $2 \times N_{node}$. It can be clear that this system is over-constrained because the number of SDFD equations in (B7) for all pixels is greater than the number of independent velocity components $u_{pq}$ and $v_{pq}$ (i.e., $N > 2 \times N_{node}$) if block size $n_x > 1$ and $n_y > 1$.

The presence of possible quantization errors and noise in the remote sensing measurements suggest that the SDFD equation in (B7) is never identically zero; however, we can choose a set of $v_{ij}$ for which it can be minimized in a least-squares sense. Accordingly, we define a Mean Square Error (MSE) function based on equation (B7) as $$MSE = \frac{1}{N} \sum_{i,j} DFCD_{ij}^2,$$

where i and j go over all pixels in $N_x \times N_y$ image ($i \in [0, N_x-1] \cap j \in [0, N_y-1]$). Minimizing the cost function with parameters $u_{kl}$ and $v_{kl}$ as variables for given indices k and l on all node points in an image represented in FIG. 13, a set of over-constrained system of equations for all cases $n_x > 1$ and $n_y > 1$ is given by $$\sum_{i,j \in \Omega_{kl}} DFCD_{ij} \left\{ \frac{\partial DFCD_{ij}}{\partial u_{kl}}, \frac{\partial DFCD_{ij}}{\partial v_{kl}} \right\} = 0 \quad (B8)$$

where $$\begin{cases} \frac{\partial DFCD_{ij}}{\partial u_{kl}} = \Delta t_h \frac{\partial u_{ij}}{\partial u_{kl}} \left[ \frac{\partial I(x, j + v_{ij}\Delta t_h, t_2)}{\partial x}\bigg|_{x=i+u_{ij}\Delta t_h} + \frac{\partial I(x, j - v_{ij}\Delta t_h, t_1)}{\partial x}\bigg|_{x=i-u_{ij}\Delta t_h} \right] \\ \frac{\partial DFCD_{ij}}{\partial v_{kl}} = \Delta t_h \frac{\partial v_{ij}}{\partial v_{kl}} \left[ \frac{\partial I(i + u_{ij}\Delta t_h, y, t_2)}{\partial y}\bigg|_{y=j+v_{ij}\Delta t_h} + \frac{\partial I(i - u_{ij}\Delta t_h, y, t_2)}{\partial y}\bigg|_{y=j-v_{ij}\Delta t_h} \right] \end{cases} \quad (B9)$$

To obtain equation (B8), the following is used $$\frac{\partial u_{ij}}{\partial u_{kl}} = \frac{\partial v_{ij}}{\partial v_{kl}} = \sum_{\alpha=0}^{1} \sum_{\beta=0}^{1} H_{kl}(i,j) \delta_{k, p+\alpha n_x} \delta_{l, q+\beta n_y},$$

where symbol $\delta_{ij}$ is the Kronecker-Delta symbol, and the summation domain is reduced from the entire image plane to only a local region $\Omega_{kl}$, so that $$\sum_{i,j} \rightarrow \sum_{i,j \in \Omega_{kl}} = \sum_{i=k-n_x+1}^{k+n_x-1} \sum_{j=l-n_y+1}^{l+n_y-1}.$$

The two independent equations in (B8) on a node point can be degraded back to a single SDFD equation (B7) when block size $n_x$ and $n_y$ are equal to unity. Of the original pixel set, the velocities $u_{kl}$ and $v_{kl}$ and their nearest neighbors are the only members contained in the summations in equation (B8).

To solve the nonlinear system equations (B8), the SDFD can be expanded in Taylor series using Gauss-Newton method $$DFCD_{ij}^{(m+1)} \approx DFCD_{ij}^{(m)} + \frac{\partial DFCD_{ij}^{(m)}}{\partial u_{kl}^{(m)}}(u_{kl}^{(m+1)} - u_{kl}^{(m)}) + \frac{\partial DFCD_{ij}^{(m)}}{\partial v_{kl}^{(m)}}(v_{kl}^{(m+1)} - v_{kl}^{(m)})$$

where m is an iteration index, and $$DFCD_{ij}^{(m)} = DFCD_{ij}(u_{pq}^{(m)}, v_{pq}^{(m)})$$

Substituting SDFD expansion into equation (B8), the following iterative equations of two component velocity $u_{kl}$ and $v_{kl}$ can be found for all indexes k and l on node points $$v_{kl}^{(m+1)} = v_{kl}^{(m)} - (A_{kl}^{(m)})^{-1} B_{kl}^{(m)} \quad (10)$$

where $$A_{kl}^{(m)} = \begin{pmatrix} (\lambda+1)\sum_{i,j \in \Omega_{kl}} \left(\frac{\partial DFCD_{ij}^{(m)}}{\partial u_{kl}^{(m)}}\right)^2 & \sum_{i,j \in \Omega_{kl}} \frac{\partial DFCD_{ij}^{(m)}}{\partial u_{kl}^{(m)}} \frac{\partial DFCD_{ij}^{(m)}}{\partial v_{kl}^{(m)}} \\ \sum_{i,j \in \Omega_{kl}} \frac{\partial DFCD_{ij}^{(m)}}{\partial u_{kl}^{(m)}} \frac{\partial DFCD_{ij}^{(m)}}{\partial v_{kl}^{(m)}} & (\lambda+1)\sum_{i,j \in \Omega_{kl}} \left(\frac{\partial DFCD_{ij}^{(m)}}{\partial u_{kl}^{(m)}}\right)^2 \end{pmatrix}$$

and $$B_{kl}^{(m)} = \begin{pmatrix} \sum_{i,j \in \Omega_{kl}} DFCD_{ij}^{(m)} \frac{\partial DFCD_{ij}^{(m)}}{\partial u_{kl}^{(m)}} \\ \sum_{i,j \in \Omega_{kl}} DFCD_{ij}^{(m)} \frac{\partial DFCD_{ij}^{(m)}}{\partial v_{kl}^{(m)}} \end{pmatrix}$$

where $\lambda \geq 0$ is a Levenberg-Marquardt factor that can be adjusted at each iteration to guarantee that the objective function MSE is convergent. A smaller value of the factor $\lambda$ can be used, bringing the algorithm closer to the Gauss-Newton method with second order converging. This Levenberg-Marquardt method can improve converge properties efficiently in practice and has become the standard of nonlinear least-squares routines.

The block size parameters $n = n_x = n_y$ can be adjusted to control the degree of the over-constrained system and robustness to noise, and to obtain the velocity field from high to low resolutions of the field structures for different applications.

The new approach is named as the Estimator with the SDFD equation to differentiate from the traditional Linear GOS (LGOS) method.

The SDFD equation on each pixel can consist of two motion-compensated predictions $I(i \pm u_{ij}\Delta t_h, j \pm v_{ij}\Delta t_h, t_{\{2,1\}})$ with variables that may be out of the position on pixels in an image. In order to compute the motion-compensated predictions, the general bilinear interpolation function in (B4) can be utilized as follows $$I(i \pm u_{ij}\Delta t_h, j \pm v_{ij}\Delta t_h, t_{\{2,1\}}) = \sum_{\alpha=0}^{1}\sum_{\beta=0}^{1} I_{p+\alpha, q+\beta}(t_{\{2,1\}}) H_{p+\alpha, q+\beta}(i \pm u_{ij}\Delta t_h, j \pm v_{ij}\Delta t_h)$$

where the function $H_{a,b}(x, y)$ in (B5) can be evaluated when $n_x = n_y = 1$, and $\{p, q\} = \{p(i \pm u_{ij}\Delta t_h), q(j \pm v_{ij}\Delta t_h)\}$.

The partial derivatives in (B9) with respect to coordinates x and y can be computed by their finite differences. In order to improve computation accuracy of numerical differentiation from the discrete set of images, the partial differential method can be implemented with two-point difference (with mask coefficients $\{1, 0\}$) and N-point central differences (for examples, with mask coefficients $\{1, 0, -1\}/2$, $\{1, -8, 0, 8, -1\}/12$, or $\{-1, 9, -45, 0, 45, -9, 1\}/60$) for differentiation. The number of the convolution points in the differentiation can be dependent on an application. In general, a larger number of the central differences can improve the performance of the velocity estimation if the scale of the feature structures (some featureless regions are located within these structures) is larger. Moreover, a spatial Gaussian low pass filter with standard deviation about one pixel in space can be used to smooth the gradient fields.

The gradient field smoothing processes can improve the performance of the velocity estimation especially for real world image data because a motion can be observed and detected only if there are enough textures in the interested region. Smoothing gradient vector fields can help increase gradient values in the featureless regions from their higher gradient neighbors by a convolution processing.

First, gradient fields with components in x and y can be evaluated on each pixel using numerical differentiation method. Then, a Gaussian low-pass filter with standard deviation from 0.375 to 1.125 pixels in space can be used to smooth the gradient fields. Finally, utilizing the general interpolation function in (B4) when $n_x = n_y = 1$, the values of the gradient fields in equations (B9) and (B10) can be calculated at any position $(x, y) = (i \pm u_{ij}\Delta t, j \pm v_{ij}\Delta t)$ in an image scene.

Almost all methods for solving the velocity in an image sequence can be based on an assumption that the surface temperature, ocean color, or brightness is conserved. Most of the successive satellite-borne images are recorded in long temporal range or from different sensors in remote sensing applications. The conservation constraint of the intensity is not always satisfied for such applications. For examples, there can be calibration differences and diurnal warming of the surface layer for the AVHRR images, and sun angle differences for ocean color reflectance data.

In the case of a global gray level change in an image scene, there does exist the gray scale normalization techniques addressing the problem which were originally developed for side looking radar image analysis. Applying these techniques, one can be normalized with respect to other by a linear transformation in such a manner that the gray level distribution in both images can be of the same mean and variance. Assuming the first image at time $t = t_1$ is a reference image, then the normalized second image at time $t = t_2$ can be given by $$\hat{I}_{ij}(t_2) = \frac{\sigma_1}{\sigma_2}[I_{ij}(t_2) - \mu_2] + \mu_1, \quad (B11)$$

where I and I-hat are the intensity recorded at time $t = t_2$ and the normalized intensity, and $\sigma_i$ and $\mu_i$ are the mean and standard deviation of the intensity values recorded within unmasked regions in image at time $t = t_i$.

The velocity estimation with the approaches herein can lead to solve a nonlinear system of equations that may have multiple solutions depending on texture structures in an image sequence. For example, to estimate a velocity field within a featureless region, the velocity field may not be unique because the initial and final positions by tracking a particular particle cannot be physically determined. This inconsistency between physical motion and observation in a featureless region is the intrinsic physical property of the inverse problem in a real world. The realistic motion fields may have multiple possibilities which satisfy the same equations and can be consistent with the same physical observation. The multiple solutions in the inverse problem by solving a nonlinear system can be congruent with this physical property.

In order to approach a globally minimized solution using iteration equations (B10), an algorithm of progressive relaxation of the over-constraint (PROC) that adapts a variable resolution of the velocity structure during the iterations can be employed in this framework. An initial block size parameter $n_0$ can be always set to be greater than a preset value of the block size n at initial iteration, and can reach a preset value of n at the end of the iteration. The velocity field can be regularized by changing the block size parameter n from a larger value (higher degree of over-constraint) to a smaller one (lower degree of over-constraint) by one on every N-th iterations until it approaches a preset value of n. The PROC algorithm can be helpful for seeking a flow field in which each vector is consistent with its neighbors.

All initial displacement field vectors can be preset to be equal to 0.01. The initial Levenberg-Marquardt factor $\lambda$ can be set to 0.001. The procedures can start from a set of preset initial values of the velocity field, then an iteration step at a fixed pixel point based on the previous iterative velocity field and the iterative equations in (B10) can be performed. Furthermore, employing a principle similar to that of the Gauss-Seidel iteration algorithm, updated values of $u_{pq}^{(m)}$ and $v_{pq}^{(m)}$ on the right-hand side of (B10) can be used as soon as they become available during the iteration processing. After all pixels are scanned in the above iteration procedures, the program can then check the convergent criteria by comparing between previous $MSE^{(m-1)}$ (before the iteration) and current $MSE^{(m)}$ (after the iteration). If the $MSE^{(m-1)}$ is greater than the $MSE^{(m)}$, then the program can take the next iteration. Otherwise, the Levenberg-Marquardt factor $\lambda$ can be multiplied by ten and the iteration procedures can be repeated again until the $MSE^{(m)} < MSE^{(m-1)}$. Combining the PROC algorithm, it can be found that the program always converges to a solution for almost all test cases for remote sensing datasets.

If a Peak Signal-to-Noise Ratio (PSNR) is defined by $$PSNR = 10\log_{10}\left(\frac{\max(I_{ij}(t_1))^2}{MSE}\right),$$

three typical converging curves that demonstrate PSNR versus the converged iteration index with different initial displacement vectors (in pixel scale) for estimating the velocity field using the PROC algorithm can be plotted. The second-order convergence properties by the Gauss-Newton and Levenberg-Marquardt methods can indicate that the PSNR for the image sequence has a sharp increase within first five iterations. However, a convergence to a static value of 43.0 (dB) can be approached after forty four iterations for all different initial guesses.

The flow field estimation framework has been validated on both synthetic and real world infrared image sequences. First, using the solution of a numerical simulation model as a benchmark, a surface tracer field can be introduced as an initial condition. Angular and magnitude measures of error can be introduced in this section, and their mean values can be applied to evaluate the performance of the velocity estimations. Finally, qualitative evaluations on can be used on real satellite-borne infrared images In an exemplary embodiment of the invention, a system and method are described herein to estimate surface velocity between two successive images, such as two satellite images. A symmetric displaced frame difference, or displaced frame central difference, equation can be utilized with iterative equations, and Gauss-Newton and Levenberg-Marquardt algorithms can be formulated for the determination of velocity field. An adaptive framework for solving the nonlinear problem can be developed based on the SDFD equations, velocity field modeling, a nonlinear least-squares model, and an algorithm of progressive relaxation of the over-constraint for seeking a flow field in which each vector is consistent with its neighbors.

There are two major advantages using the SDFD equation in applications. The toughest problem is the convergent problem for resolving a nonlinear system with huge number of parameters. Therefore, the first advantage of the SDFD equation is that the scale of the displacement vector in the SDFD equation is only half of the total displacement of motion. The program using the SDFD equation can converge easily to a global optimal solution by iteration, even when the preset initial velocity field is far away from a converged solution. The second advantage is that the spatial derivatives in the iteration equation (B10) are for both images scenes for this nonlinear model. The average of the derivatives in equation (B9) for two tracer structures at different times can be helpful to improve the performance of the velocity estimation.

In an exemplary embodiment of the invention, a unified adaptive framework for motion field estimation from an image sequence is described herein. The computational and implementation complexities of the inverse problem have been greatly simplified by the new iteration approach with equations (B10) for full dense velocity estimation. Moreover, the resolved displacement vectors in an iteration procedure are only half of the total travel distance of a feature structure. Using the SDFD equation, the flow field by the adaptive framework can converge rapidly to a global optimal solution, especially for larger scale displacement estimation. Since both linear and nonlinear models are iterative, there is no significant difference in computation cost between the linear or nonlinear model in a single iteration.

The proposed approach using a smaller number of on-node velocity components to interpolate full density velocity field can have potential applications in both computer vision and remote sensing fields. The feature of robustness to noise by adjusting the block size is demonstrated using AVHRR image sequences in remote sensing applications.

Experimental evaluations, comparisons, and applications with a numerical simulation model and infrared image sequences have been demonstrated. Both average angular and magnitude error measurements between the estimated flow fields, and the numerical simulation model and the CODAR array indicate that the proposed work provides major improvement over the linear inverse model for the simulation and real AVHRR data sets.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Portions of the invention can comprise a computer program that embodies the functions described herein. Furthermore, the modules described herein, such as the tomography module, scope algorithm module, and optimization module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A method for processing an image sequence, comprising;
providing a symmetric displaced frame difference equation;
receiving an input image sequence comprising a pair of image frames individually including multidimensional image data corresponding to a plurality of pixel locations at different times;
using at least one processor, solving the symmetric displaced frame difference equation using:
an iteration equation and the image data of the pair of image frames to determine a displacement field describing displacement vectors at half of the total displacement vector, and
at least one bilinear polynomial function expressing a multidimensional displacement field; and
determining, using the at least one processor, displacement by motion for the input image sequence based on the solved symmetric displaced frame difference equation.

2. The method of claim 1,
wherein the multidimensional image data of the pair of frames is two-dimensional, and
wherein the symmetric displaced frame difference equation is $$I(i+u_{ij}\Delta t_h, j+v_{ij}\Delta t_h, t_2) - I(i-u_{ij}\Delta t_h, j-v_{ij}\Delta t_h, t_1) = 0,$$

wherein:
I is an intensity of the image data,
i is a pixel index in a horizontal direction x,
j is a pixel index in a vertical direction y orthogonal to the horizontal direction x,
$u_{ij}$ is a component of the velocity vector on a pixel point,
$v_{ij}$ is another component of the velocity vector on a pixel point, and
$\Delta t_h$ is equal to $\Delta t/2$, wherein $\Delta t$ is a time difference between the pair of image frames ($t_1$ and $t_2$).

3. The method of claim 1, wherein solving the symmetric displaced frame difference equation comprises using at least one iteration equation derived from the symmetric displaced frame difference equation by conversion to a fully or over-constrained system using a nonlinear least squares model of the displacement field.

4. A motion estimator apparatus, comprising:
at least one processor; and
a memory storing a symmetric displaced frame difference equation,
wherein the at least one processor is operative to:
receive an input image sequence comprising a pair of image frames individually including multidimensional image data corresponding to a plurality of pixel locations at different times,
solve the symmetric displaced frame difference equation using;
an iteration equation and the image data of the pair of image frames to determine a displacement field describing displacement vectors at half of the total displacement vector, and
at least one bilinear polynomial function expressing a multidimensional displacement field, and
determine displacement by motion for the input image sequence based on the solved symmetric displaced frame difference equation.

5. The motion estimator apparatus of claim 4,
wherein the multidimensional image data of the pair of frames is two-dimensional, and
wherein the symmetric displaced frame difference equation is $$I(i+u_{ij}\Delta t_h, j+v_{ij}\Delta t_h, t_2) - I(i-u_{ij}\Delta t_h, j-v_{ij}\Delta t_h, t_1) = 0,$$

wherein:
I is an intensity of the image data,
i is a pixel index in a horizontal direction x,
j is a pixel index in a vertical direction y orthogonal to the horizontal direction x,
$u_{ij}$ is a component of the velocity vector on a pixel point,
$v_{ij}$ is another component of the velocity vector on a pixel point, and
$\Delta t_h$ is equal to $\Delta t/2$, wherein $\Delta t$ is a time difference between the pair of image frames ($t_1$ and $t_2$).

6. The motion estimator apparatus of claim 4, wherein the at least one processor is operative to solve the symmetric displaced frame difference equation using at least one iteration equation derived from the symmetric displaced frame difference equation by conversion to a fully or over-constrained system using a nonlinear least squares model of the displacement field.

7. A non-transitory computer readable medium with computer executable instructions for:
providing a symmetric displaced frame difference equation;
receiving an input image sequence comprising a pair of image frames individually including multidimensional image data corresponding to a plurality of pixel locations at different times;
solving the symmetric displaced frame difference equation using:
an iteration equation and the image data of the pair of image frames to determine a displacement field describing displacement vectors at half of the total displacement vector, and
at least one bilinear polynomial function expressing a multidimensional displacement field; and
determining displacement by motion for the input image sequence, based on the solved symmetric displaced frame difference equation.

8. The non-transitory computer readable medium of claim 7:
wherein the multidimensional image data of the pair of frames is two-dimensional, and
wherein the symmetric displaced frame difference equation is $$I(i+u_{ij}\Delta t_h, j+v_{ij}\Delta t_h, t_2) - I(i-u_{ij}\Delta t_h, j-v_{ij}\Delta t_h, t_1) = 0,$$

wherein:
I is an intensity of the image data,
i is a pixel index in a horizontal direction x,
j is a pixel index in a vertical direction y orthogonal to the horizontal direction x,
$u_{ij}$ is a component of the velocity vector on a pixel point,
$v_{ij}$ is another component of the velocity vector on a pixel point, and
$\Delta t_h$ is equal to $\Delta t/2$, wherein $\Delta t$ is a time difference between the pair of image frames ($t_1$ and $t_2$).

9. The non-transitory computer readable medium of claim 7, comprising computer-executable instructions for solving the symmetric displaced frame difference equation using at least one iteration equation derived from the symmetric displaced frame difference equation by conversion to a fully or over-constrained system using a nonlinear least squares model of the displacement field.

10. The method of claim 1, wherein receiving the input image sequence comprises receiving only two image frames.

11. The motion estimator apparatus of claim 4, wherein the input image sequence comprises only two image frames.

12. The non-transitory computer readable medium of claim 7, wherein receiving the input image sequence comprises receiving only two image frames.

13. The method of claim 1, further comprising:
determining, using the at least one processor, displacement by motion for the input image sequence based on the solved symmetric displaced frame difference equation.

14. The method of claim 1, wherein solving the symmetric displaced frame difference equation using the iteration equation and the image data of the pair of image frames to determine a displacement field describing displacement vectors comprises:
determining, using the at least one processor, a displacement vector corresponding to a moving particle in the image sequence.

15. The method of claim 14, further comprising:
determining, using the at least one processor and the determined displacement vector corresponding to the moving particle, a plot of a motion particle trajectory of the moving particle.

16. The motion estimator apparatus of claim 4, wherein the at least one processor is further operative to:
determine displacement by motion for the input image sequence based on the solved symmetric displaced frame difference equation.

17. The non-transitory computer readable medium of claim 7, further comprising computer-executable instructions for:
determining, using the at least one processor, displacement by motion for the input image sequence based on the solved symmetric displaced frame difference equation.

* * * * *